US008797828B1

(12) United States Patent
Lev et al.

(10) Patent No.: US 8,797,828 B1
(45) Date of Patent: Aug. 5, 2014

(54) REMOTE OPTICAL SEISMIC SURVEYING AND DETECTION AND IMAGING OF UNDERGROUND OBJECTS

(75) Inventors: Aner Lev, Modi'in (IL); Bruno Sfez, Jerusalem (IL)

(73) Assignee: Soreq NRC, Yavne (IL)

( * ) Notice: Subject to any disclaimer, the term of this patent is extended or adjusted under 35 U.S.C. 154(b) by 381 days.

(21) Appl. No.: 13/027,529

(22) Filed: Feb. 15, 2011

Related U.S. Application Data

(60) Provisional application No. 61/304,494, filed on Feb. 15, 2010.

(51) Int. Cl.
G01V 8/00 (2006.01)
G01H 9/00 (2006.01)
G01V 11/00 (2006.01)

(52) U.S. Cl.
CPC ... *G01V 8/00* (2013.01); *G01V 11/00* (2013.01); *G01H 9/00* (2013.01); *G01H 9/002* (2013.01)
USPC ............ 367/64; 367/14; 356/72; 356/486; 356/497

(58) Field of Classification Search
CPC ............ G01V 1/00; G01H 9/00; G01H 9/002
USPC ......................................... 367/38, 149; 467/64
See application file for complete search history.

(56) References Cited

U.S. PATENT DOCUMENTS

| | | | | |
|---|---|---|---|---|
| 3,629,796 A | * | 12/1971 | Brownscombe et al. | 367/9 |
| 4,670,646 A | * | 6/1987 | Spivey | 250/201.9 |
| 5,070,483 A | * | 12/1991 | Berni | 367/14 |
| 5,109,362 A | * | 4/1992 | Berni | 367/14 |
| 5,754,293 A | * | 5/1998 | Farhadiroushan | 356/478 |
| 5,930,730 A | * | 7/1999 | Marfurt et al. | 702/16 |
| 6,087,652 A | * | 7/2000 | O'Meara et al. | 250/214.1 |
| 6,233,056 B1 | * | 5/2001 | Naulleau et al. | 356/520 |
| 6,285,514 B1 | * | 9/2001 | O'Meara et al. | 359/721 |
| 6,809,991 B1 | | 10/2004 | Pepper et al. | |
| 7,583,387 B2 | | 9/2009 | Meldahl et al. | |
| 2002/0149998 A1 | * | 10/2002 | Hoover | 367/189 |
| 2003/0137655 A1 | * | 7/2003 | Wegmann | 356/124 |
| 2003/0189708 A1 | | 10/2003 | Chang | |
| 2005/0018538 A1 | * | 1/2005 | Soubaras | 367/38 |
| 2006/0244950 A1 | * | 11/2006 | Wegmann | 356/124 |
| 2008/0007715 A1 | * | 1/2008 | Meldahl et al. | 356/72 |

OTHER PUBLICATIONS

Aranchuk, V., et al., "Multi-beam laser Doppler vibrometry for acoustic landmine detection using airborne and mechanically-coupled vibration," Proceedings of the SPIE, vol. 5794 (Jun. 2005), 7 pages.

* cited by examiner

*Primary Examiner* — Luke Ratcliffe
*Assistant Examiner* — Hovhannes Baghdasaryan
(74) *Attorney, Agent, or Firm* — Brown Rudnick LLP

(57) ABSTRACT

System for optical seismic surveying of an area of interest including at least one seismic source, at least one laser source, at least one optical sensing system and a processor, the processor being coupled with the seismic source, the laser source and the optical sensing system, the seismic source for generating at least one seismic wave in the area of interest, the laser source for generating a matrix of laser spots over the area of interest, the optical sensing system for detecting reflections of the laser spots as a speckle pattern, wherein the seismic source modifies the speckle pattern and wherein the processor determines at least one property of the seismic wave according to the modified speckle pattern thereby generating a seismic map of the area of interest.

31 Claims, 12 Drawing Sheets

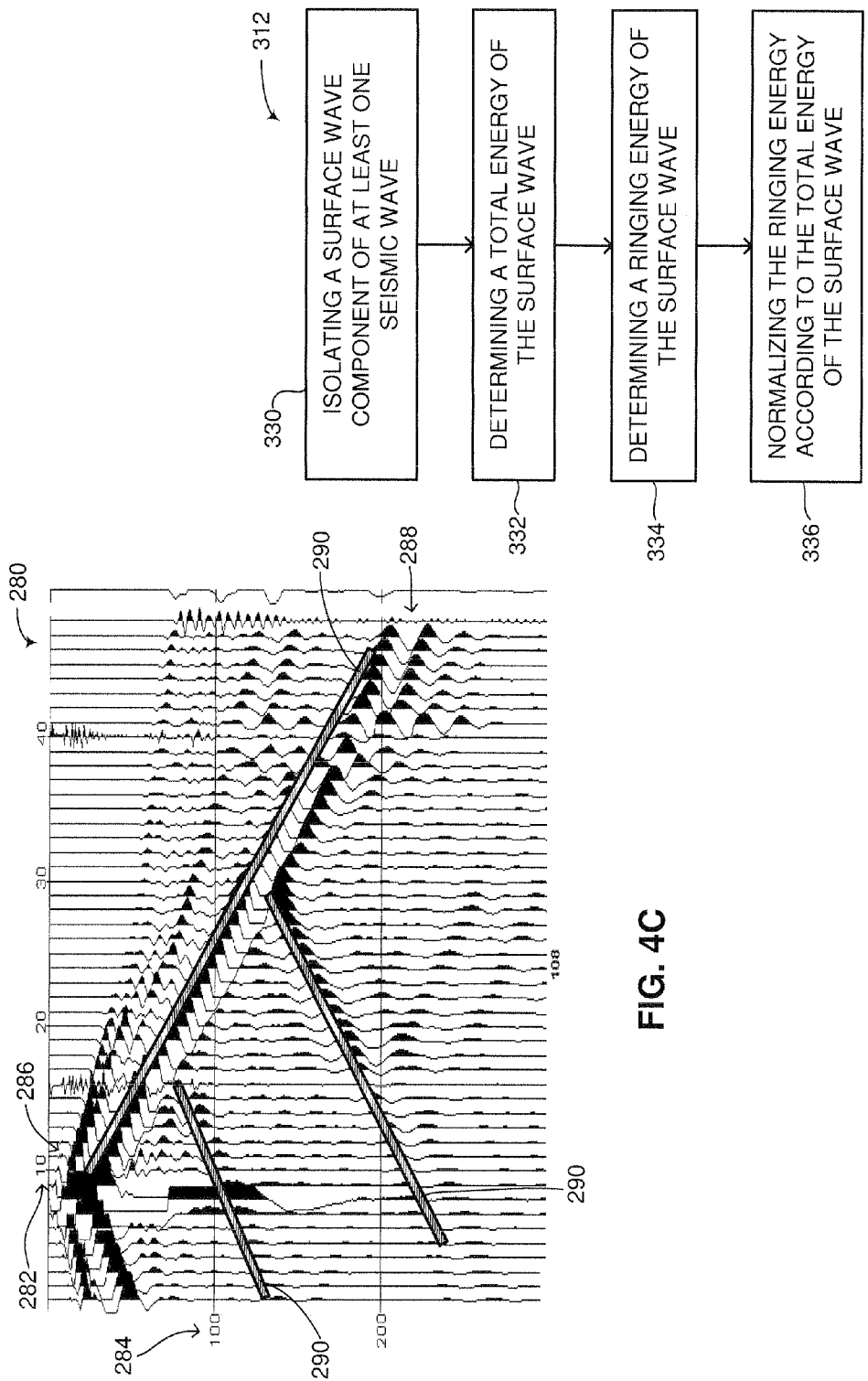

REMOTE OPTICAL SEISMIC SURVEYING AND DETECTION AND IMAGING OF UNDERGROUND OBJECTS

This application claims priority to U.S. Provisional Application No. 61/304,494, filed 15 Feb. 2010, the entire contents of which is hereby incorporated by reference.

FIELD OF THE DISCLOSED TECHNIQUE

The disclosed technique relates to optical seismic surveying, in general, and to methods and systems for remotely surveying an area of interest using seismic waves and optics and for detecting and imaging underground objects, in particular.

BACKGROUND OF THE DISCLOSED TECHNIQUE

Underground threats in the context of war and military activities refer to objects and tactics employed in attacking an enemy force which make use of the ground as a camouflage for concealing these threats. For example, underground threats can include landmines, buried explosives, booby traps placed within the ground, underground tunnels, covered holes and pits, roadside charges against convoys and the like. Underground threats can also include changes in ground composition which may pose a threat to heavy military equipment and military personnel, such as muddy terrain, swamps, quicksand and the like. With the blurring of the boundary between straight out war and guerilla or terrorist activity, underground threats have increased in number over the years as they are in general easily acquired and built (such as in the case of landmines or explosives) yet difficult to detect. In addition, underground threats are very difficult to neutralize in a military context as underground threats need to be detected in real-time without the knowledge of an expert.

One known method for detecting underground objects is underground imaging using techniques taken from the fields of mineral and oil exploration. In such techniques, a geological survey is taken of an area or region of interest. Based on the geological survey, an image of the ground and what lies beneath can be reconstructed and objects or threats in the ground can be determined. In general, geological surveys are major operations which take a significant amount of time to set up and complete. Also, field experts are usually required to read the geological surveys and interpret the data to determine what objects lie in the ground beneath.

Another known method for detecting underground objects is seismic mapping. In this method, devices known as geophones, which can detect and record seismic responses of the ground over time are positioned in the ground in an area of interest. Geophones are in general inserted into the ground and set up in an array format. One or more seismic sources are then used to generate seismic waves over a period of time in the area of interest. The seismic sources can be manually or hydraulically activated hammers. The seismic waves are substantially reflected and diffracted by objects, open spaces and general differences in ground composition. The geophones which were placed in the ground are synchronized with one another and detect the seismic responses of the area of interest based on the reflections and diffractions of the seismic waves received. Algorithms are then used to extract the underground structure of the area of interest as well as the presence and position of any objects or open spaces in the ground. These algorithms substantially reconstruct a seismic map of the ground under the area of interest. This method is precise and accurate and can be used to detect objects in a significantly large area of interest in a single survey. At the same time, this method is difficult to implement practically in a military context to detect underground objects in real-time as the set up time of installing and placing the geophones in the ground is too lengthy and slow for military use, for example, during a time of war. In addition, setting up an array of geophones for seismic mapping is usually a costly and cumbersome procedure, as the array needs to be checked and calibrated before it can be used to record seismic responses. Such a set up can take days to prepare and fully install, although once prepared, seismic measurements can be taken almost instantaneously.

A further known method for detecting underground objects is ground penetrating radar (herein abbreviated GPR). In GPR, electromagnetic waves in the 1-100 kilohertz (herein abbreviated kHz) range are directed towards an area of interest. In this frequency range, the electromagnetic waves can penetrate the ground up to tens of meters. Reflections from these electromagnetic waves are received and can be used to determine the structure of the ground up to tens of meters below the surface of the ground, including the detection of objects. In general, GPR systems need to be in close proximity to the area of interest, usually within ten meters of the ground. Therefore, an area of interest in which it is suspected that it may contain underground objects must be scanned by a GPR system, which is a procedure that can be time consuming. This method is used in military contexts although it may hamper the mobility of the army units which use and require such systems.

Another known system for detecting underground objects, such as landmines, is the laser Doppler vibrometer (herein abbreviated LDV). LDV systems are based on interferometry and substantially measure Doppler shifts between a laser beam aimed at a target surface and a reference beam. LDV systems are very sensitive and can detect nanometer size vibrations on a target surface yet are ineffective by themselves in determining a seismic map of an area of interest, especially of the volume beneath a target surface. LDV systems are ineffective in such tasks since they are very sensitive to turbulence and have a fixed sensitivity with respect to distance. LDV systems have been combined with acoustic systems in which strong sound waves are directed towards a region of interest, thereby causing small vibrations in the ground in the region of interest. An LDV system is then used to measure differences in frequency of the laser beam directed at the region of interest and a reference beam, thereby generating a seismic map. Such systems are limited though in detecting underground objects as the seismic information extracted from such systems is not as full as the seismic information which can be extracted from geophones.

Other systems for remotely detecting underground objects are known in the art. U.S. Pat. No. 6,809,991 issued to Pepper, et al., entitled "Method and apparatus for detecting hidden features disposed in an opaque environment," is directed to a system for remotely locating and identifying features disposed within an opaque environment, such as a landmine buried under the surface of the ground. The system includes two laser sources, a vibration sensor module and a signal processing unit. One laser source produces a modulated exciter beam with the other being a probe beam. The signal processing unit receives signal information from the vibration sensor module and controls the modulation of the exciter beam.

The exciter laser periodically emits a modulated beam which, upon absorption in the ground, generates an acoustic wave which propagates along the surface of the ground as well as in the subsurface. The acoustic wave is produced through thermo-elastic and/or ablative effects. The acoustic modes within the ground are scattered due to inhomogeneities such as buried objects. The acoustic spectrum generated in the ground substantially replicates the modulation format of the exciter laser. A small portion of the scattered waves travels back to the surface resulting in small but detectable vibrations. The probe laser detects these vibrations as the laser beam impinges on the surface of the ground and a small portion of the laser beam is reflected back by the surface towards the system. The vibrations of the surface are superimposed on the reflected beam. The reflected beam is provided to the vibration sensor module which converts the light wave into an electric signal. The electric signal is supplied to the signal processing unit. The information in the electric signal is representative of the vibrations at the surface which in turn is representative of a buried object. The signal processing unit analyzes the signal and determines what type of object is buried in the ground by comparing the information in the received signals to a set of predetermined data patterns. The predetermined data patterns correspond to a variety of different objects which might be encountered, such as a landmine, a rock, a tree root and so forth.

The processor selects an object and changes the characteristics of the exciter laser beam in order to adjust the generated acoustic waves so as to achieve acoustic modes that best couple with the selected object. By analyzing the information received from the vibration sensor module after the change in characteristics, the processor verifies its selection. The processor may reject its selection and try various other characteristics of the exciter laser beam in order to determine what object is buried in the ground.

U.S. Patent Application Publication No. 2003/0189708 to Chang, entitled "Antitank mine detection system for armored vehicle" is directed to a system for armored vehicles for remotely detecting antitank mines. The system includes an armored vehicle for carrying the optical and electronic components of the system. The armored vehicle is also used as an exciter for seismic waves. The system also includes an optical source body disposed on the front end of the armored vehicle, a sensor disposed on the side of the optical source body and a controller which controls the radiation from the optical source body as well as the speed of the armored vehicle. The controller includes a data processing part for converting an image received by the sensor to an electric signal and for processing it.

The body of the armored vehicle, along with its load, serves as a source for seismic wave motion which is distorted due to the presence of an antitank mine. The distortion is located by the system by measuring fluctuations of the ground. The optical source produces two laser beams, an object beam which is directed to the ground and a reference beam. Part of the object beam is reflected back towards the sensor. The reflected object beam and the reference beam are collected by the sensor, thereby obtaining an interference speckle image. The image is then processed in real-time by the data processing part which detects the point where the wave motion is distorted. By comparing the data collected from the interference speckle image with existing data stored therein, the processor determines whether the object distorting the wave motion is an antitank mine or a rock.

An article published in the Proceedings of the SPIE, vol. 5794 (June 2005), pp. 624-631, by Aranchuk, et al., entitled "Multi-beam laser Doppler vibrometry for acoustic landmine detection using airborne and mechanically-coupled vibration," describes a system for detecting buried landmines using Doppler interferometry and acoustic-to-seismic coupling. The system includes a multi-beam laser Doppler vibrometer (LDV), a phase-lock loop demodulator, a computer employed for signal processing, and either airborne sound (i.e., specially designed loudspeakers) or mechanical shakers to excite vibrations of the ground.

A vibration is excited in the ground. The LDV produces a laser beam which is split into 16 object beams and 16 reference beams. The 16 object beams are focused onto the ground along a line. A portion of the object beams which are scattered back is combined with the reference beams whose frequency is shifted by 100 kHz, thereby producing 16 frequency modulated signals with a 100 kHz carrier frequency. The frequency deviation, due to the Doppler Effect, of each signal is proportional to the velocity of the ground at the point of measurement. The output signals of the LDV are demodulated by the phase-lock loop. Each of the 16 output signals of the phase-lock loop is then digitized by the computer which calculates the velocity spectrum of each beam. All of the beams can be moved forward (that is in a direction perpendicular to the line formed by the beams) by using a rotating mirror so that an area segment can be scanned to generate a velocity image over the scanned area. Landmines buried in this area can be located by examining the ground velocity image.

U.S. Pat. No. 7,583,387 issued to Meldahl, et al., entitled "Seismic exploration" is directed to a system and method for seismic exploration and seismic imaging by using a moving laser interferometer, in particular for use in submarine seismic exploration. The system comprises an interferometer which includes a source of coherent object light, a source producing a reference beam which is coherent with the object beam, and a detector or array of detectors. Additionally, the method may include a step of generating a seismic event such that the system can detect the response to the event.

An object beam is sent from the interferometer towards an inspected surface, e.g. the sea bed. Part of the object beam is reflected back up towards the interferometer where it is combined with a reference beam to illuminate a detector. In the case where an array or a line of detectors is used the reference beam, or a set of combined spatially distributed reference beams, must cover the whole array. The combination of the object beam and the reference beam creates an interference pattern that is detected by the detector. The signals from all of the detectors are digitized and fed to a processor which calculates the movement of the inspected surface.

The object beam sent from the interferometer is first expanded and then arranged to converge at a point which is approximately the same distance beyond the measured surface as the surface is spaced from the beam source. This feature and other means, such as modulating the reference beam, allow the system to measure the movement of the surface while in motion, for example by being towed by a ship. The speed of motion of the interferometer, the sampling rate of the detectors and the size of the area illuminated by the object beam are arranged so that sequential areas of the surface overlap.

SUMMARY OF THE PRESENT DISCLOSED TECHNIQUE

It is an object of the disclosed technique to provide a novel method and system for remotely surveying an area of interest using at least one seismic source and an optical configuration including at least one laser source and at least one optical sensing system. In accordance with the disclosed technique, there is thus provided a system for optical seismic surveying of an area of interest, the system including at least one seismic source, at least one laser source, at least one optical sensing system and a processor. The processor is coupled with the at least one seismic source, the at least one laser source and the at least one optical sensing system. The at least one seismic source is for generating at least one seismic wave in the area of interest. The at least one laser source is for generating a matrix of laser spots over the area of interest. The at least one optical sensing system is for detecting reflections of the laser spots as a speckle pattern. The at least one seismic source modifies the speckle pattern and the processor determines at least one property of the at least one seismic wave according to the modified speckle pattern thereby generating a seismic map of the area of interest.

In accordance with another embodiment of the disclosed technique, there is thus provided a method for optical seismic surveying of an area of interest. The methods includes the procedures of generating a matrix of laser spots over the area of interest, generating at least one seismic wave in the area of interest, thereby modifying the matrix of laser spots and receiving reflections of the modified matrix of laser spots as at least one speckle pattern. The method also includes the procedure of processing the at least one speckle pattern, thereby generating data representing at least one seismic property of the area of interest.

BRIEF DESCRIPTION OF THE DRAWINGS

The disclosed technique will be understood and appreciated more fully from the following detailed description taken in conjunction with the drawings in which:

FIG. 4C is an illustration of a seismic map generated according to the sub-procedures of FIG. 4B, constructed and operative in accordance with a further embodiment of the disclosed technique;

FIG. 4E is a schematic illustration of a third set of sub-procedures of the method of FIG. 4A, operative in accordance with a further embodiment of the disclosed technique;

DETAILED DESCRIPTION OF THE EMBODIMENTS

Figure 1:
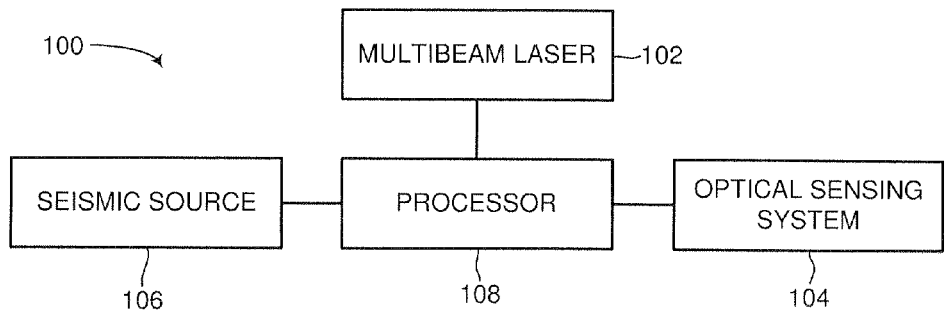
FIG. 1 is a schematic illustration of a system for detecting and imaging underground objects, constructed and operative in accordance with an embodiment of the disclosed technique.

The disclosed technique overcomes the disadvantages of the prior art by providing a novel system and method for seismic surveying. The novel method and system enables a seismic map to be remotely generated for an area of interest without having to substantially be in physical contact with the ground of the area of interest. In one embodiment of the disclosed technique, a seismic source for providing a seismic wave is in physical contact with the ground of the area of interest. Using the generated seismic map, an image of the area of interest can be generated and underground objects of varying sizes can be detected. According to the disclosed technique, the area of interest is illuminated by a laser beam, or an array of laser beams, such that a matrix of laser spots is formed on the ground of the area of interest. Alternatively, the laser beam may be scanned across the ground. At least one seismic wave is then provided to the area of interest which modifies the matrix of laser spots. A detector then receives and detects reflections of the laser spots from the ground of the area of interest as a modified speckle pattern. From changes between the laser spots transmitted to the ground and reflected from the ground, variations in the phase of the laser spots can be determined. These variations are due to the at least one seismic wave traversing the ground. The variations in phase of the laser spots are then used to determine the amplitude and phase of the at least one seismic wave. Due to the presence of a matrix of laser spots, a complete seismic map of the area of interest can be determined in real-time according to the disclosed technique. The seismic map may be a single point, a 1D map or a 2D map of the area of interest. In addition, according to the disclosed technique, the seismic map of the area of interest can be used to generate an image of the area of interest and can thus be used to detect and determine the presence of underground objects in the area of interest. The disclosed technique can thus be referred to as a technique for optical seismic surveying. As mentioned above and described below, a seismic wave is propagated through an area of interest using known procedures, yet the detection of the seismic response of the area of interest is determined by optically imaging the surface of the area of interest using a laser source.

According to one embodiment of the disclosed technique, the detector is a high speed camera. In this embodiment, a detector array in the high speed camera is divided into a plurality of segments. Each segment substantially determines changes in phase of a different single laser spot on the ground of the area of interest. Processing the changes in phase of each laser spot thereby enables properties of the seismic wave to be determined or reconstructed. According to another embodiment of the disclosed technique, the detector is a single detector with a high speed moving grating positioned before the opening of the detector. The received speckle pattern of the laser spots is substantially modulated due to the presence of the high speed moving grating before the single detector. According to this embodiment, the modulated speckle pattern can be demodulated and properties of the seismic wave can be determined or reconstructed. According to a further embodiment of the disclosed technique, a substantially large area of interest can be imaged by a matrix of laser spots in real-time which is then used to determine properties of a propagated seismic wave in the area of interest. According to the disclosed technique, the seismic wave can be generated by a controlled or active seismic source, such as a large hammer repeatedly striking the ground. In addition, the seismic wave can be generated by an uncontrolled or passive seismic source, such as background seismic activity of the ground of the area of interest. According to the disclosed technique, the detector can determine differences in the speckle pattern of the reflected matrix of laser spots even when the speckle pattern is modified by only background seismic activity. This embodiment thereby obviated the need for an active seismic source to generate a seismic map for an area of interest. According to another embodiment of the disclosed technique, underground objects can be detected by determining changes in the properties of the propagated seismic wave over time. Different types of objects change the properties of the propagated seismic wave in different ways. According to this embodiment, specific frequencies of the propagated seismic wave as a function of time can be used to determine the size of underground objects. According to the disclosed technique, the size of underground objects is inversely proportional to the frequency of the propagated seismic wave in time such that lower frequencies indicate substantially large objects and higher frequencies indicate substantially small objects.

Throughout the description, the expression "area of interest" is used to denote an area or region of interest in which properties of a seismic wave propagating through the area of interest are to be determined. An area of interest herein substantially represents a volume of interest that includes the ground surface of the area of interest as well as what is beneath the ground surface. Therefore an area of interest may include underground objects. In addition, the expression "underground objects" as used in the description of the disclosed technique can refer to physical objects in the ground, such as rocks, ore, landmines, buried charges, powder kegs and the like. Underground objects can also refer to changes in ground composition, such as from rock to sand, or to open spaces, like covered holes and pits as well as to tunnels, cavities, caves, bunkers, manholes and air pockets in the ground. Underground objects can also be referred to as underground anomalies or underground abnormalities. In general, according to the disclosed technique, underground objects of varying sizes can be determined, in particular objects as small as 5 centimeters in length (such as rocks or very small landmines) or as large as 50 meters in length (such as underground tunnels). In addition, underground objects may refer to any object underground having a seismic impedance that is detectably different than the seismic impedance of the ground surrounding the underground object.

It is noted that according to the disclosed technique, no geophones need to be physically deployed in the ground to determine the seismic response of an area of interest. As such, a laser source for generating a matrix of laser spots on the area of interest, as well as the detector for detecting reflections from the matrix of laser spots can be located relatively far away from the region of interest, for example hundreds of meters away. The disclosed technique thus eliminates cumbersome geophone infrastructure and increases operational flexibility, especially in military context. The disclosed technique also reduces the risk in surveying an area of interest for underground objects, certainly when such underground objects or threats are buried explosives, bunkers, underground tunnel entrances and underground tunnels. In addition, since the disclosed technique uses seismic waves which naturally travel on the surface of the ground, the seismic source can also be situation relatively far away from the area of interest. The disclosed technique thereby enables remote seismic surveying of an area of interest using optical technology.

Furthermore, according to the disclosed technique, since optics are used to substantially generate a seismic map, the imaging scale of the seismic map can be changed by changing the density of the matrix of laser spots transmitted to the ground of the area of interest as well as the optical zoom of the detector used. Also, according to the disclosed technique, multiple beams of light are used to generate the matrix of laser spots. The number of beams of light used enables algorithms to be used in the processing of the reflected matrix of laser spots that take into account a large number of channels and also enable real-time processing of the received reflections. It is also noted that the disclosed technique does not make use of a local oscillator, as is used in state-of-the-art vibrometers which mix a reflected beam of laser light with a source beam of laser light to determine a change in phase. In general vibrometers require the use of lasers having very high coherence lengths. Such vibrometers may be very sensitive to clutters, which are known to be substantially strong near the surface of the ground. Furthermore, the disclosed technique makes use of secondary waves in analyzing the seismic response of an area of interest, which is unlike known geological surveying methods where secondary waves are usually eliminated from such methods.

Reference is now made to FIG. 1 which is a schematic illustration of a system for detecting and imaging underground objects, generally referenced 100, constructed and operative in accordance with an embodiment of the disclosed technique. System 100 includes a multibeam laser 102, an optical sensing system 104, a seismic source 106 and a processor 108. Optical sensing system 104 can also be referred to as a detector and is referenced interchangeably through the description as detector 104 and optical sensing system 104. Multibeam laser 102 and detector 104 are each coupled with processor 108. In one embodiment, seismic source 106 is also coupled with processor 108. In another embodiment, seismic source 106 is not coupled with processor 108. It is noted that each of multibeam laser 102 and detector 104 may be physically coupled with processor 108 or wirelessly coupled with processor 108 such that processor 108 can communicate with and control multibeam laser 102 and detector 104. In the embodiment in which seismic source 106 is coupled with processor 108, seismic source 106 may also be either coupled physically or wirelessly with processor 108. In this respect, the various elements of system 100 can be spread out and positioned in different locations with respect to an area of interest (not shown), thereby increasing the versatility of the disclosed technique. This is shown below in FIGS. 7, 8, 9A and 9B. It is noted that system 100 may include a plurality of multibeam lasers (not shown), a plurality of detectors (not shown) and/or a plurality of seismic sources (not shown). As mentioned above, detector 104 can also be referred to as an optical sensing system.

Multibeam laser 102 simultaneously transmits a matrix of laser spots on an area of interest. According to the disclosed technique, the use of a plurality of laser beams for illuminating the area of interest is substantially necessary for enabling real-time imaging of the area of interest. The matrix of laser spots substantially represents a plurality of laser beams transmitted to different positions on the area of interest. Each laser beam is substantially focused on the surface of the area of interest. The plurality of laser beams thus form a matrix, or array of laser spots on the surface of the area of interest. Detector 104 is an optical detector capable of receiving reflections of the matrix of laser spots reflected from the surface of the area of interest. Multibeam laser 102 can be embodied as any laser having a coherence level high enough such that reflections from the matrix of laser spots generate a speckle pattern on detector 104. In general, the coherence length of multibeam laser 102 should be as least as long as the diameter of a single laser spot on the surface of the area of interest. In addition, multibeam laser 102 must be capable of simultaneously transmitting a plurality of laser beams to the area of interest, hence a matrix of laser spots, where each laser beam is substantially unique in a given laser property, such as frequency. In this respect, reflections from each laser beam, or laser spot, can then be uniquely detected by detector 104. In addition, multibeam laser 102 should illuminate the area of interest with well defined laser spots, with minimal background laser radiation between adjacent laser spots. Multibeam laser 102 can be embodied as an array of laser diodes in which each laser diode generates a laser beam that illuminates a different location on the area of interest such that a matrix of laser spots is transmitted to the area of interest. In this embodiment, each laser diode in the laser diode array should be incoherent with respect to every other laser diode in the laser diode array. Multibeam laser 102 can thus be embodied as a plurality of fiber lasers coupled together. Multibeam laser 102 can also be embodied as a single beam laser (not shown) coupled with a diffractive optical element (not shown) placed in front of the exit aperture (not shown) of multibeam laser 102 where laser light exits multibeam laser 102. The diffractive optical element substantially splits the single beam of laser light exiting the exit aperture into a plurality of laser beams which are focused as a matrix of laser spots on the area of interest. In general, the single beam of laser light exits the exit aperture as a collimated beam of laser light which is then split by the diffractive optical element. The diffractive optical elements in general maintains the characteristics of the laser light such that additional optics are not required to focus the matrix of laser spots on the ground of the area of interest.

For example, multibeam laser 102 could laser model ELR-50-1550-LP-SF from IPG photonics, lasing at eye-safe wavelengths and based on fiber laser technology. As another example, multibeam laser 102 could also be embodied as a single-mode Fabry-Perot diode laser, such as laser diode model HL6548FG from Hitachi, lasing at near infrared wavelengths or at visible wavelengths. A further example for multibeam laser 102 could be any single-mode laser having a coherence length of at least 1 millimeter. Another example could be the DFB diode lasers in product family AA1401 from EM4 Inc. (USA).

Detector 104 is a high speed detector and may be embodied as a high speed single detector, a high speed array of detectors or as a high speed camera. According to one embodiment of the disclosed technique, high speed regarding the detector or the camera refers to a capture speed of 500 to 2000 frames per second (herein abbreviated fps) and a shutter speed 0.5 to 2 milliseconds. In addition, if detector 104 is embodied as a high speed camera, then the camera should have a high gain, be very sensitive due to the high speed and have a minimal fixed pattern noise which reduces signal correlation. For example, detector 104 could be SWIR camera model Cheetah-640-CL from Xenics (Belgium) if multibeam laser 102 transmits laser light in the short wave infrared wavelength range. As another example, detector 104 could be the Phantom v9.1 camera from Vision Research (Canada) if multibeam laser 102 transmits light in the visible or near infrared wavelength range.

Seismic source 106 generates at least one seismic wave in the area of interest and substantially modifies some of the characteristics of the matrix of laser spots illuminated on the ground of the area of interest. Seismic source 106 may generate short time seismic pulses in the ground by repeatedly striking the surface of the ground. The short time seismic pulses may be tens of milliseconds in duration. Seismic source 106 may also continuously vibrate the ground. Seismic source 106 may be a controllable seismic source such as an explosive or a set of explosives, a thumper truck or a seismic vibrator (such as the Vibroseis). Seismic source 106 can also be implemented as any kind of hammer striking the ground which is controlled mechanically, hydraulically or electrically. An example of seismic source 106 may be accelerated weight seismic source model ESS200T from Gisco (USA). In another embodiment of the disclosed technique, seismic source 106 is an uncontrolled seismic source and is not considered as an element which is included in system 100. For example, background seismic activity exists constantly in the ground of the Earth and is due to regular or irregular movement of the ground. According to the disclosed technique, changes in some of the properties of the matrix of laser spots occur even due to the background seismic activity of the Earth. Since a matrix of laser spots is used as well as a high speed detector, changes in the matrix of laser spots can be determined without requiring the use of an active seismic source. Therefore, in this embodiment, system 100 does not include seismic source 106. Rather, it is assumed that changes in the matrix of laser spots are due to the presence of the background seismic activity of the Earth. It is noted that seismic source 106 may include a plurality of seismic sources (not shown) which generate a relatively small number of seismic waves in the area of interest.

As mentioned above, multibeam laser 102 illuminates an area of interest with a matrix of laser spots. The matrix of laser spots is dense in the sense that the distance between two adjacent laser spots is at least 2 to 3 times smaller than the smallest object which is sought to be detected in the area of interest. Seismic source 106 then propagates at least one seismic wave in the area of interest, thereby modifying some of the properties of the matrix of laser spots, such as their respective phases. Detector 104 receives reflections of the matrix of laser spots as at least one image or as a plurality of successive images of the reflections of the matrix of laser spots. Detector 104 then provides the received image or images to processor 108. Processor 108 substantially processes the received image or images by comparing the phase of each laser spot in the matrix of laser spots as transmitted by multibeam laser 102 with the phase of each laser spot in the matrix of laser spots as received by detector 104. As a matrix with a plurality of laser spots is used as well as a high speed detector, minimal changes in phase in each laser spot can be detected. Processor 108 determines these changes in phase over time, for example by cross-correlating successive images of the reflections of the matrix of laser spots, and uses them to determine characteristics of the seismic wave propagated in the area of interest, such as the amplitude, frequency and phase of the seismic wave. These properties can then be used by processor 108 to generate a seismic map of the area of interest. Also, processor 108 can generate data representing at least one seismic property of the area of interest according to determined properties or characteristics of the seismic wave. In addition, processor 108 can use the generated seismic map to image the area of interest, i.e., to image the surface of the area of interest as well as the ground underneath the area of interest. The image of the area of interest can then further be used by processor 108 to detect the presence of underground objects in the area of interest and to determine their size and nature. The methods used by processor 108 are further described below in FIGS. 4A-4D and in FIGS. 6A-6B.

Figure 2A:
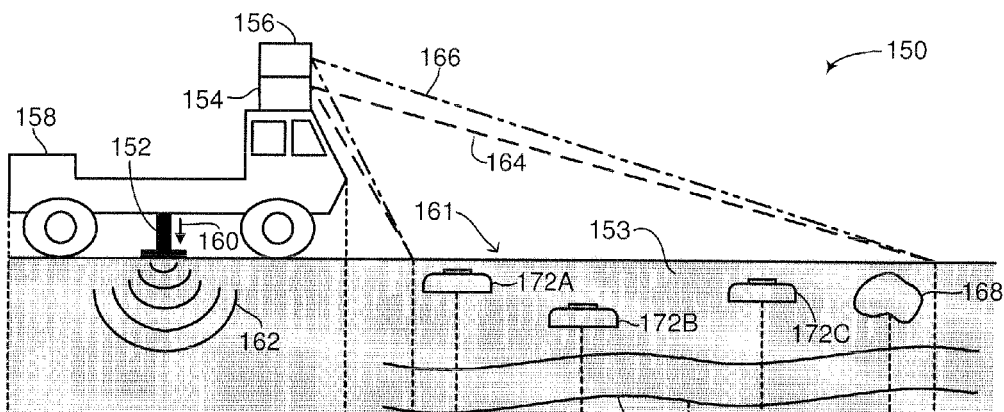
FIG. 2A is a schematic side view illustration of the system of FIG. 1 being used to detect and image underground objects, constructed and operative in accordance with another embodiment of the disclosed technique.
Figure 2B:
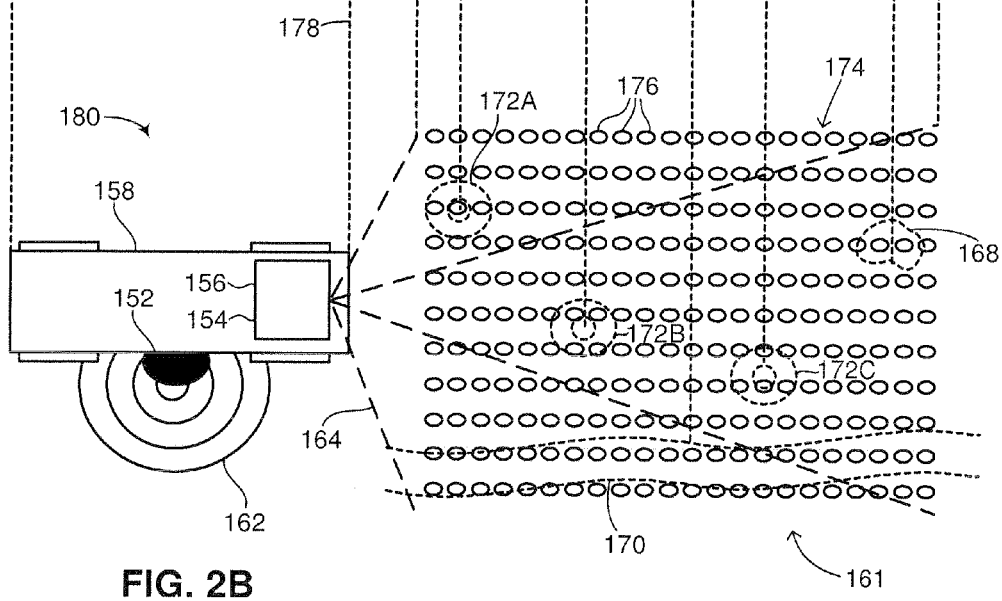
FIG. 2B is a schematic top view illustration of the system of FIG. 1 being used to detect and image underground objects, constructed and operative in accordance with a further embodiment of the disclosed technique.

Reference is now made to FIGS. 2A and 2B. FIG. 2A is a schematic side view illustration of the system of FIG. 1 being used to detect and image underground objects, generally referenced 150, constructed and operative in accordance with another embodiment of the disclosed technique. FIG. 2B is a schematic top view illustration of the system of FIG. 1 being used to detect and image underground objects, generally referenced 180, constructed and operative in accordance with a further embodiment of the disclosed technique. Equivalent elements in FIGS. 2A and 2B are indicated using identical numbering. With reference to FIG. 2A, side view 150 includes a seismic source 152, a multibeam laser 154 and a detector 156. Seismic source 152, multibeam laser 154 and detector 156 are mounted on a vehicle 158. Vehicle 158 may be a thumper truck. Vehicle 158 drives along a road (not labeled) and actively uses seismic source 152 to generate at least one seismic wave 162 in a ground 153. At least one seismic wave 162 travels in ground 153 including an area of interest 161. Seismic source 152 substantially strikes ground 153 in the direction of an arrow 160. Multibeam laser 154 illuminates area of interest 161 by transmitting a matrix of laser spots (not labeled in FIG. 2A). The matrix of laser spots transmitted substantially covers the surface of area of interest 161 as demarcated by a set of dotted lines 164. Detector 156 receives reflections from the matrix of laser spots substantially from the surface of area of interest 161 as demarcated by a set of dotted lines 166. As shown in FIG. 2A, ground 153 includes a plurality of underground objects such as a rock 168, a tunnel 170 and a plurality of landmines 172A, 172B and 172C.

With reference to FIG. 2B, top view 180 shows a matrix of laser spots 174 which includes a plurality of laser spots 176. As shown, multibeam laser 154 simultaneously transmits a plurality of laser beams in the form of a matrix of laser spots. Matrix of laser spots 174 substantially covers the entire surface area of area of interest 161. Each laser spot 176 is unique in a given characteristic such that detector 156 can detect respective changes in each laser spot 176 over time. As shown, a plurality of lines 178 demarcates the relative location of similar elements in FIGS. 2A and 2B. Not shown in side view 150 or top view 180 is a processor, which is coupled, for example wirelessly, with seismic source 152, multibeam laser 154 and detector 156, which receives the reflections detected by detector 156 over time as successive images of the changes in the matrix of laser spots 174. As described below in FIGS. 3A, 3B, 5B and 5C, the reflections received by detector 156 are substantially received as a speckle pattern of laser light. The general configuration of multibeam laser 154 and detector 156 can be referred to as an optical geophone array which is capable of detecting the presence of seismic waves at a very high resolution and sensitivity. This is turn enables the system of FIG. 1 to be used in real-time seismic surveying in a feasible manner.

As seen in FIG. 2B, matrix of laser spots 174 is formed from multibeam laser 154, where each laser spot in matrix of laser spots 174 is formed by a different beam of laser light emanating from multibeam laser 154 and is focused on a different portion of area of interest 161. The laser spots of matrix of laser spots 174 are therefore not equally distant from detector 156 which results in different speckle sizes being received on detector 156 from reflections of matrix of laser spots 174 (not shown in FIG. 2B). The different speckle sizes are proportional to the distance between the laser spots on area of interest 161 and the position of detector 156. According to the disclosed technique, a substantially similar speckle size on detector 156 should be maintained irregardless of the distance of a laser spot from detector 156. Maintaining a substantially similar speckle size on detector 156 results in maintaining a substantially similar signal-to-noise ratio for each reflection of matrix of laser spots 174 received on detector 156. According to one embodiment of the disclosed technique, the following configuration of multibeam laser 154 and detector 156 can be used in order to scale or equalize the reflections from matrix of laser spots 174 to be substantially similar. Equalizing the reflections is substantially similar to equalizing the signal originating from a seismic response of matrix of laser spots 174. First, multibeam laser 154 and detector 156 are to be positioned relatively close to one another, as shown in FIGS. 2A and 2B. Second, matrix of laser spots 174 should be transmitted to area of interest 161 in the form of an array or matrix such that for a given row in the array of matrix, laser spots are substantially equidistant to detector 156, as shown in FIGS. 2A and 2B. Third, as shown below in FIGS. 3A and 3B, each row of laser spots in matrix of laser spots 174 should be imaged in detector 156 on a detector array (not shown) which is in defocus in relation to an imaging plane (not shown) of detector 156. Each row of laser spots in matrix of laser spots 174 should be imaged on a different row of sub-arrays on the detector array of detector 156. Fourth, for each row of sub-arrays on the detector array of detector 156, detector 156 should be constructed to have different lenses (not shown) in order to match the speckle size between reflections from different rows of laser spots on matrix of laser spots 174.

Figure 3A:
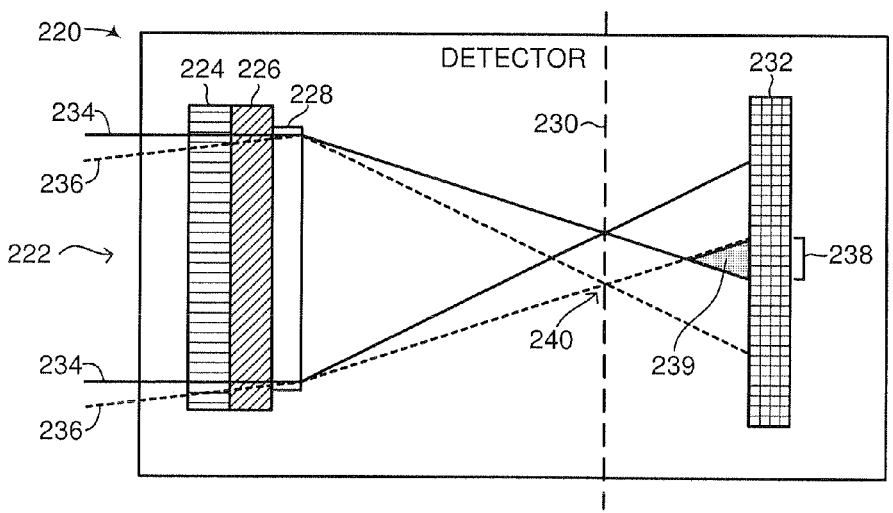
FIG. 3A is a schematic side view illustration of the detector of FIG. 1 without an aperture matrix, constructed and operative in accordance with another embodiment of the disclosed technique.

Reference is now made to FIG. 3A which is a schematic side view illustration of the detector of FIG. 1 without an aperture matrix, generally referenced 220, constructed and operative in accordance with another embodiment of the disclosed technique. Detector 220 is substantially similar to detector 104 and represents an embodiment of detector 104. Detector 220 includes an opening 222, a band pass filter 224, a polarizer 226, a lens 228 and a detector array 232. Band pass filter 224 is an optional element. Band pass filter 224 and polarizer 226 are positioned between opening 222 and lens 228. Shown in FIG. 3A are two incoming reflections of laser light from a matrix of laser spots (not shown) transmitted to an area of interest (not shown), a first reflection 234 and a second reflection 236.

First reflection 234 and second reflection 236 enter detector 220 via opening 222. It is noted that a plurality of reflections enter detector 220 via opening 222 and that only two such reflections are shown in FIG. 3A for purposes of clarity. Band pass filter 224 can be embodied as a narrow interference filter. Band pass filter 224 only enables electromagnetic radiation within a specific wavelength band to pass through. The band pass of band pass filter 224 is selected to include the range of wavelengths at which a multibeam laser (not shown) of the disclosed technique illuminates the area of interest, thereby preventing ambient light, sunlight and other beams of electromagnetic radiation from entering detector 220. Ambient light as well as sunlight entering detector 220 may blind detector array 232. By reducing ambient light, sunlight and other beams of light from entering detector 220, the visibility of first reflection 234 and second reflection 236 on detector array 232 is increased as is the contrast in the speckle pattern received, as explained below. Band pass filter 224 may be optional at night when no sunlight is present. An embodiment of detector 220 may still operate during the day without band pass filter 224, although in this embodiment, the multibeam laser may need to be a much stronger laser such that first reflection 234 and second reflection 236 are detectable by detector array 232 amidst sunlight.

First reflection 234 and second reflection 236 pass through band pass filter 224 and then pass through polarizer 226. Polarizer 226 can be embodied as a crossed polarizer filter. The matrix of laser spots transmitted to the area of interest may be polarized in a particular orientation. Polarizer 226 substantially only lets polarized light having the same polarization as the matrix of laser spots through. It is noted that first reflection 234 and second reflection 236 may included polarized laser light and unpolarized laser light. Whereas band pass filter 224 filters out light and radiation outside its specific wavelength band, it may still enable sunlight and other sources of radiation to pass there through if their wavelengths are within the specific wavelength band. For example, a portion of the radiation coming from sunlight may still pass through band pass filter 224. Polarizer 226 substantially filters out electromagnetic radiation which passes through band pass filter 224 but which is not a reflection from the matrix of laser spots as well as reflections from the matrix of laser spots which are unpolarized. Polarizer 226 thus also increases the visibility of first reflection 234 and second reflection 236 on detector array 232 and also increases the contrast in the speckle pattern received, as explained below. The increase in contrast of the speckle pattern by polarizer 226 is at the cost of receiving a weaker reflection signal, since unpolarized portions of first reflection 234 and second reflection 236 are filtered out of detector 220 by polarizer 226.

After passing through polarizer 226, first reflection 234 and second reflection 236 pass through lens 228 and are focused onto detector array 232. As shown in FIG. 3A, an imaging plane 230 of lens 228 represents a virtual plane where the images from first reflection 234 and second reflection 236 are in focus, as shown by an arrow 240. According to the disclosed technique, detector array 232 is not placed to coincide with imaging plane 230 but is rather placed behind imaging plane 230, thereby increasing the distance between lens 228 and detector array 232. In this respect, detector array 232 is positioned to be in strong defocus in relation to imaging plane 230. The amount of defocus is related to the requirements of the system of the disclosed technique, such as the field of view of detector 220, minimal resolution and signal-to-noise requirements, as well as the distance of detector 220 from the area of interest. For example, if the distance between detector 220 and the laser spots on the ground is 20 meters, then lens 228 is focused on a virtual plane (not shown) which is 0.5 to 1 meter farther than the detector. Detector array 232 can be embodied as a high speed camera or as any other type of two dimensional (herein abbreviated 2D) detector array. Detector array 232 may have a linear or nonlinear gamma factor. In the case of high electronic noise in detector array 232, the gamma correction could be a factor as high as 2 to 3. First reflection 234 and second reflection 236 are thus received on detector array 232 as defocused spots.

In general, the matrix of laser spots transmitted to the area of interest is transmitted from a multibeam laser (not shown) which is sufficiently coherent to generate a speckle pattern on detector array 232 when reflections from the matrix of laser spots are received. It is well known in the art of optics that speckle patterns are extremely sensitive to tilt yet barely sensitive to translation. As seismic waves generate very small yet nonetheless detectable tilts in the ground, the dynamics of speckle patterns can be used, according to the disclosed technique, to characterize seismic waves.

Detector array 232 is substantially divided into a plurality of sections. Each section may be referred to as a sub-array. In general, detector array 232 is substantially large enough such that it can be divided into sufficient sections such that each section receives a reflected image of only a single unique laser spot. Detector array 232 may be embodied such that each section receives reflections at a specific wavelength or frequency. Therefore, if each laser spot in the matrix of laser spots (not shown) is transmitted at a unique frequency, then each section is designed to receive reflections at a unique frequency corresponding to the unique frequency at which the laser spot was transmitted at. As the number of laser spots in the matrix of laser spots increases, reflections from laser spots may overlap on detector array 232, for example as shown in a section 238 on detector array 232 and by a section 239, since reflections are received on detector array 232 in defocus. This overlap of the reflections on detector array 232 may lead to crosstalk between the reflections and thus crosstalk between the signals provided by detector array 232 to a processor (not shown). In another embodiment of the disclosed technique, the number of laser spots in the matrix of laser spots may be reduced such that reflections of the laser spots on detector array 232 do not overlap, even when received in defocus. In this embodiment, each laser spot transmitted by the multibeam laser may be transmitted having identical characteristics. According to another embodiment of the disclosed technique as shown in FIG. 3B, an aperture matrix (not shown) is used to avoid or substantially lessen crosstalk between reflections of the laser spots.

Detector array 232 may be coupled with a frame grabber (not shown) for storing images of the speckle pattern received on detector array 232 over time. In general, detector array 232 receives reflections from the matrix of laser spots over a specified time period. The specified time period may be less than a millisecond. As detector array 232 is a high speed detector array, detector array 232 receives a plurality of images of the speckle pattern over the specified time period. In general, the frame grabber also operates at high speed and can store or grab, for example, 12 bits/pixel. A plurality of speckle patterns is grabbed from detector array 232 at a rate of between 1000 to 2000 fps. In general, the frame grab rate is such that at least two frames, i.e., at least two images of speckle patterns, are grabbed and stored during the period of one seismic wave transmitted by a seismic source (not shown), such as seismic source 106 (FIG. 1). The frame grabber provides the grabbed or stored images to a processor, such as processor 108 (FIG. 1) for further processing as described below. In general, the further processing is used to generate a seismic map of the area of interest and to detect underground objects in the area of interest.

Figure 3B:
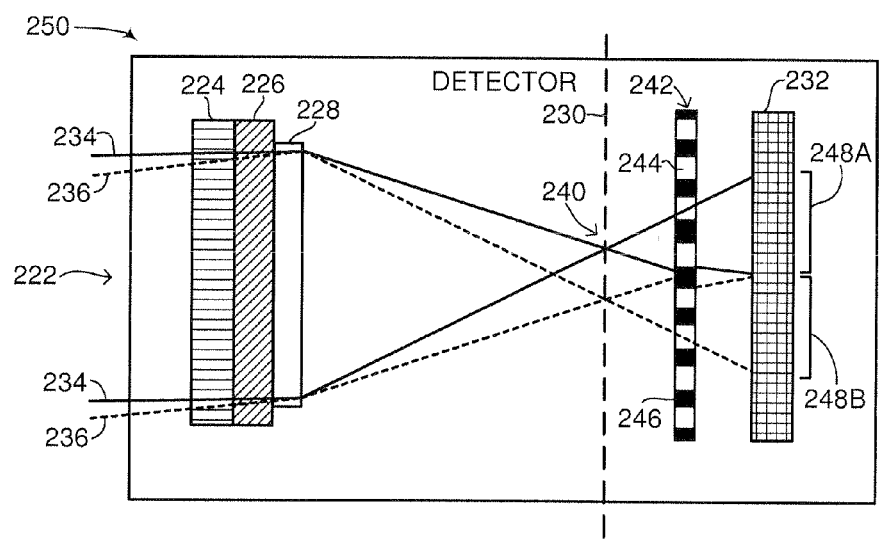
FIG. 3B is another schematic side view illustration of the detector of FIG. 1 with an aperture matrix, constructed and operative in accordance with a further embodiment of the disclosed technique.

Reference is now made to FIG. 3B which is another schematic side view illustration of the detector of FIG. 1 with an aperture matrix, generally referenced 250, constructed and operative in accordance with a further embodiment of the disclosed technique. Detector 250 is substantially similar to detector 220 (FIG. 3A) and includes similar elements. Equivalent elements between detectors 220 and 250 are labeled using identical numbering. Detector 250 includes an aperture matrix 242, which is shown in a front view below in FIG. 3C. Aperture matrix 242 is placed between imaging plane 230 and detector array 232. Aperture matrix 242 substantially includes a plurality of openings 244 as well as a plurality of opaque sections 246. This is shown more clearly in FIG. 3C. Plurality of openings 244 enables reflections received by detector 250 to pass through whereas opaque sections 246 prevent reflections from passing through. Each one of plurality of openings 244 can be considered similar to a camera iris in that each one of plurality of openings 244 substantially limits the spread of first reflection 234 and second reflection 236 as received on detector array 232. Since detector array 232 is in defocus with respect to imaging plane 230, received reflections exhibit a spatial spread of light. This spatial spread of light may overlap different sub-arrays in detector array 232, thereby leading to crosstalk between different reflections in the speckle pattern received by detector array 232. As is known in the art, crosstalk substantially represents the undesired mixing of neighboring signals. Since aperture matrix 242 substantially limits the amount of light or radiation impinging on detector array 232, in particular, the amount of light or radiation impinging on a particular section of detector array 232, crosstalk can thus be reduced or avoided in detector 250. As shown in FIG. 3B, the spatial spread of first reflection 234 on detector array 232 is now limited as shown by a section 248A, and the spatial spread of second reflection 236 on detector array 232 is now limited as shown by a section 248B. Sections 248A and 248B may correspond to individual sub-arrays of detector array 232. As shown in FIG. 3B, sections 248A and 248B do not overlap, thereby avoiding crosstalk between first reflection 234 and second reflection 236. Using detector 250, a higher density of matrix of laser spots can be used to illuminate the area of interest, thus also increasing the resolution of the generated seismic map of the area of interest as well as the generated image of the area of interest. It is also noted that using detector 250, the multibeam laser (not shown) transmitting the matrix of laser spots may transmit a matrix of laser spots wherein each laser spot has substantially similar or even substantially identical properties.

Figure 3C:
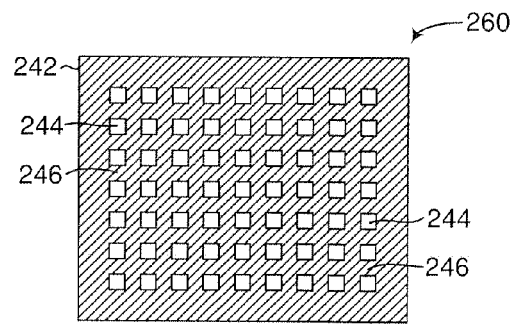
FIG. 3C is a schematic front view illustration of the aperture matrix of FIG. 3B, constructed and operative in accordance with another embodiment of the disclosed technique.

Reference is now made to FIG. 3C which is a schematic front view illustration of the aperture matrix of FIG. 3B, generally referenced 260, constructed and operative in accordance with another embodiment of the disclosed technique. Similar elements between FIGS. 3B and 3C are labeled using identical numbering. As can be seen, plurality of openings 244 is positioned in an array or matrix form. Plurality of opaque sections 246 substantially represents the material from which aperture matrix 242 is constructed from and does not enable radiation or reflected laser light to pass there through. In general, the number of plurality of openings 244, their spacing relative to one another, their size as well as the positioning of aperture matrix 242 in relation to imaging plane 230 (FIG. 3B) and detector array 232 (FIG. 3B) are all determined based on the number and density of laser spots in a matrix of laser spots (not shown) illuminating an area of interest (not shown) such that crosstalk between neighboring sections of detector array 232 is minimized or avoided. It is also noted that the number of plurality of openings 244, their spacing relative to one another, their size as well as the positioning of aperture matrix 242 in relation to imaging plane 230 (FIG. 3B) and detector array 232 (FIG. 3B) are also determined such that the size of a single reflected laser spot as a single speckle on detector array 232 is at least larger than the size of a single pixel on detector array 232. According to the disclosed technique, for example, the relationship between speckle size and pixel size on detector array 232 may be that the speckle size is about four times larger than the pixel size.

Figure 4A:
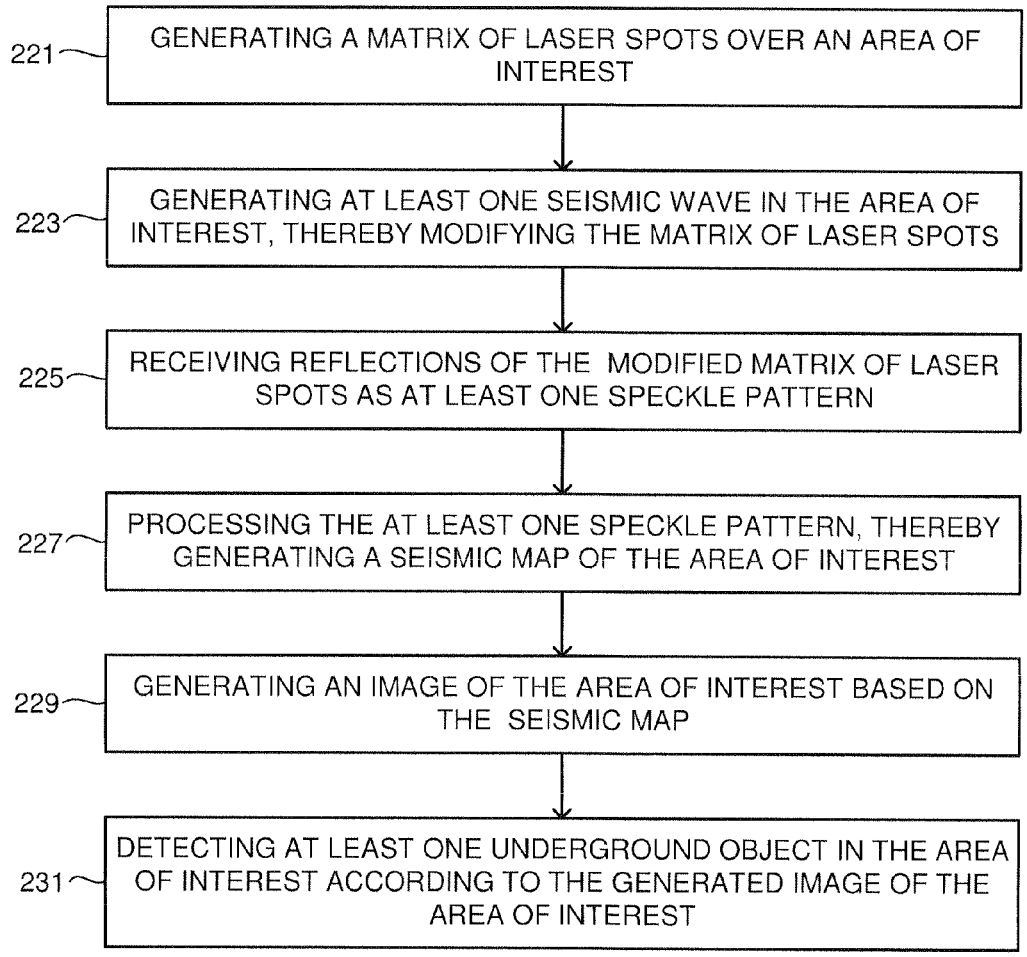
FIG. 4A is a schematic illustration of a method for detecting and imaging underground objects, operative in accordance with a further embodiment of the disclosed technique.

Reference is now made to FIG. 4A which is a schematic illustration of a method for detecting and imaging underground objects, operative in accordance with a further embodiment of the disclosed technique. In a procedure 221, a matrix of laser spots is generated and is transmitted over an area of interest. The matrix of laser spots substantially covers the area of interest. With reference to FIG. 2A, multibeam laser 154 (FIG. 2A) illuminates area of interest 161 (FIG. 2A) by transmitting a matrix of laser spots (not labeled in FIG. 2A). In a procedure 223, at least one seismic wave is generated in the area of interest. The seismic wave modifies the matrix of laser spots. With reference to FIG. 2A, vehicle 158 (FIG. 2A) drives along a road and actively uses seismic source 152 (FIG. 2A) to generate at least one seismic wave 162 (FIG. 2A) in a ground 153 (FIG. 2A). The at least one seismic wave 162 travels in ground 153 including in an area of interest 161 (FIG. 2A).

In a procedure 225, reflections from the modified matrix of laser spots are received as at least one speckle pattern. The speckle pattern is received on a detector. In procedure 225, a plurality of speckle patterns may be received, each speckle pattern being representative of reflections received within a specified time period. Each received speckle pattern may be stored or recorded as an image. With reference to FIG. 2A, detector 156 (FIG. 2A) receives reflections from the matrix of laser spots substantially from the surface of area of interest 161 (FIG. 2A). In a procedure 227, the at least one received speckle pattern is processed, thereby generating a seismic map of the area of interest. In an alternative to procedure 227, the at least one received speckle pattern is processed, thereby generating data representing at least one seismic property of the area of interest. The generated data may be represented as a seismic map of the area of interest. In general, in procedure 227 a plurality of speckle patterns are processed which in turn enable a seismic map of the area of interest to be generated. Procedure 227 includes a plurality of sub-procedures which are described below in FIGS. 4B and 6A. With reference to FIG. 2B, a processor, which is coupled, for example wirelessly, with seismic source 152 (FIG. 2B), multibeam laser 154 (FIG. 2B) and detector 156 (FIG. 2B), receives the reflections detected by detector 156 over time as successive images of the changes in the matrix of laser spots 174 (FIG. 2B).

In a procedure 229, an image of the area of interest is generated based on the seismic map determined in procedure 227. In an alternative to procedure 229, a time sequence of images is generated of the area of interest based on the data generated in procedure 227. In general, the generated time sequence of images includes a time series, where each time series is associated with each laser spot in the received reflections of the modified matrix of laser spots in the generated data of procedure 227. Procedure 229 includes a plurality of sub-procedures which are described below in FIGS. 4D and 4E. With reference to FIG. 1, processor 108 (FIG. 1) can use the generated seismic map to image the area of interest, i.e., to image the surface of the area of interest as well as the ground underneath the area of interest. In a procedure 231, at least one underground object in the area of interest is detected according to the generated image of the area of interest. In an alternative to procedure 231, at least one underground object in the area of interest is detected according to the generated time sequence of images of the area of interest from procedure 229. With reference to FIG. 1, the image of the area of interest can then further be used by processor 108 (FIG. 1) to detect the presence of underground objects in the area of interest and to determine their size and nature.

Figure 4D:
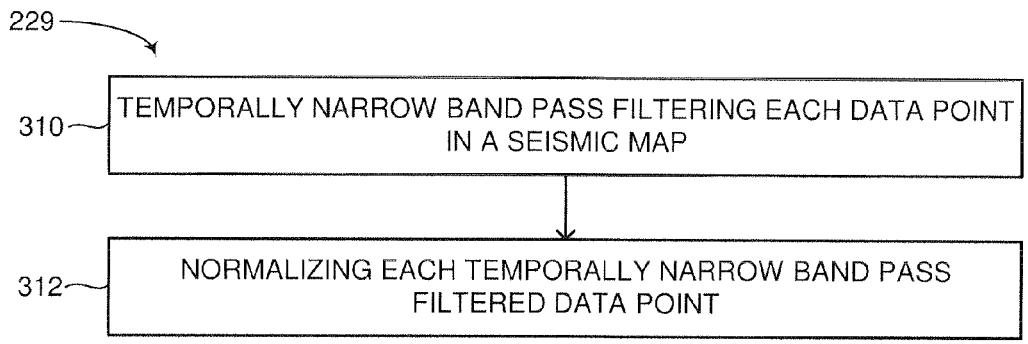
FIG. 4D is a schematic illustration of a second set of sub-procedures of the method of FIG. 4A, operative in accordance with another embodiment of the disclosed technique.
Figure 4B:
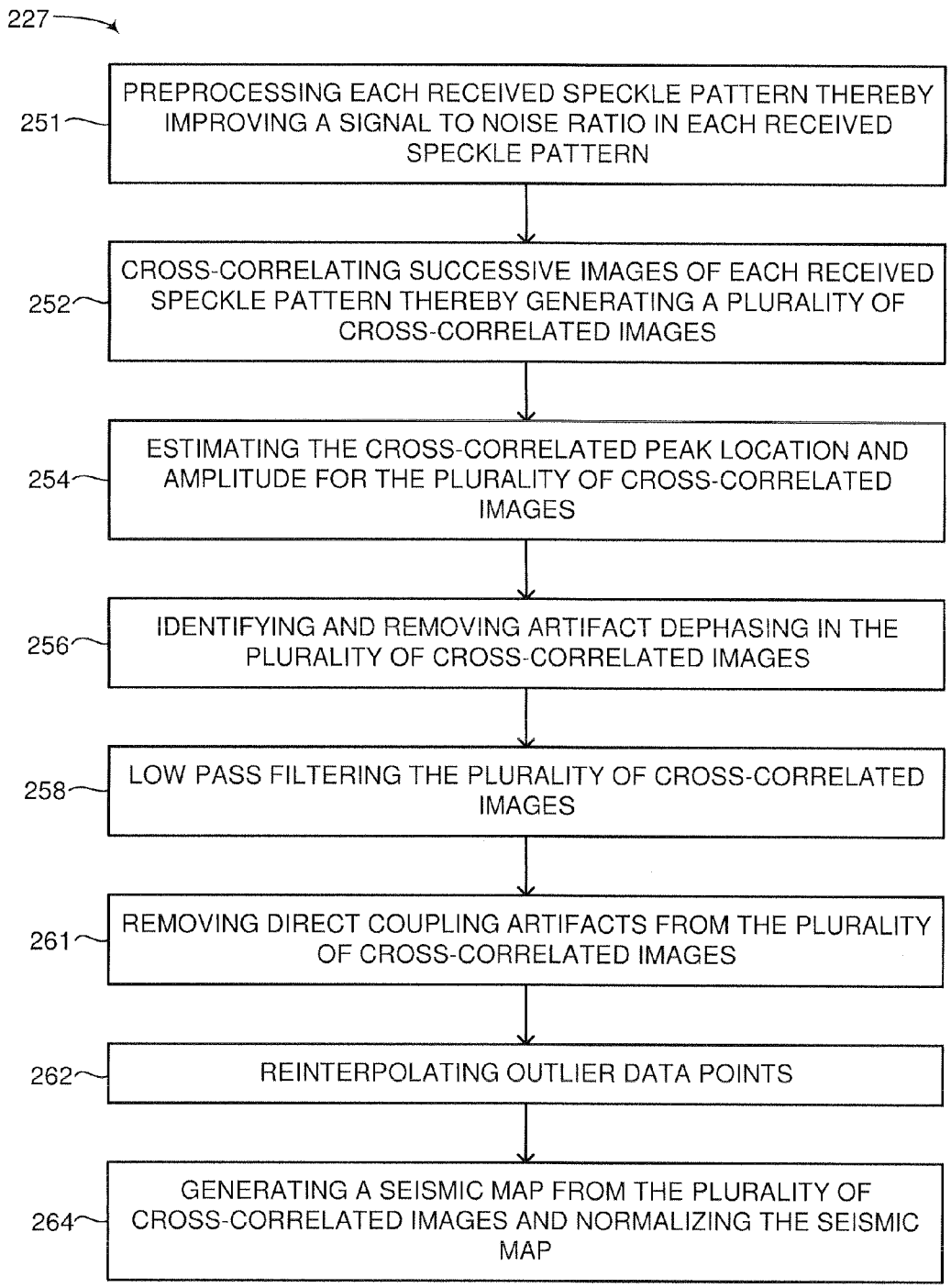
FIG. 4B is a schematic illustration of a first set of sub-procedures of the method of FIG. 4A, operative in accordance with another embodiment of the disclosed technique.

Reference is now made to FIG. 4B which is a schematic illustration of a first set of sub-procedures of the method of FIG. 4A, operative in accordance with another embodiment of the disclosed technique. FIG. 4B in particular is a schematic illustration of one embodiment of the sub-procedures of procedure 227. FIG. 4B substantially represents the sub-procedures of the disclosed technique by which at least one received speckle pattern is processed to thereby generate a seismic map of an area of interest. In a procedure 251, each stored or recorded image of the speckle patterns received by a detector over time is preprocessed. The preprocessing improves a signal-to-noise ratio in the images of the speckle patterns. The preprocessing of procedure 251 can include applying a denoising filter to each stored image using a wavelet filter. The preprocessing of procedure 251 can also include normalizing each stored image and applying a threshold to each stored image.

In a procedure 252, successive stored images of the received speckle patterns are cross-correlated, thereby generating a plurality of cross-correlated images. In general, the cross-correlation determines the relative displacement of speckles in the stored images of the received speckle patterns between successive stored images of the received speckle patterns. The cross-correlation in procedure 252 can be a 2D cross-correlation between images, either executed directly on the speckle pattern images or in the frequency domain of those images. The cross-correlation in procedure 252 can be a cross-correlation between consecutive images in which a 2D fast Fourier transform (herein abbreviated FFT) is applied. In a procedure 254, the cross-correlated peak location and amplitude for each one of the plurality of cross-correlated images is estimated. The peak location and amplitude of each cross-correlated image can be estimated using super-resolution techniques, such as a parabolic fit, a polynomial fit, a Gaussian interpolation or a spline interpolation. In general, the estimated peak location is proportional to the velocity of particles in an area of interest as a seismic wave is transmitted through the area of interest. In this procedure, the estimated peak location and amplitude for each cross-correlated image is stored, or recorded as a function of time. These cross-correlated images as a function of time are further processed in procedures 256-261 to remove any undesired signals in these images which may be superimposed due to physical phenomena of the area of interest.

In a procedure 256, artifact dephasing in the cross-correlated images is identified and removed. Artifact dephasing relates to changes in the structure of the ground of the area of interest due to the propagation of at least one seismic wave through the area of interest. As a seismic wave propagated through an area of interest, a force may be applied to the particles in the ground (for example, sand particles, mud particles and the like). This force may lead to inelastic movement of these particles, thereby resulting in a modification of the structure of the ground of the area of interest. In procedure 256, any modification in the structure of the ground due to forces which result from the propagation of a seismic wave in the area of interest is identified. These modifications can be identified, according to the disclosed technique, by noting that such modifications cause strong decreases in the peak amplitudes of the cross-correlated images. Such modifications can be converted into identifiable dephases in the cross-correlated images which are then removed in procedure 256.

In a procedure 258, the plurality of cross-correlated images is low pass filtered. In general, in a perfectly elastic cross-correlated image, the peak location in the image should return to its origin after being excited by a seismic wave. In practice, cross-correlated images are not perfectly elastic, possibly due to a DC component associated with the seismic wave. This results in the peak location in the cross-correlated images being displaced from its origin. This displacement complicates the processing of the cross-correlated images. In procedure 258, this displacement in the cross-correlated images is removed by low pass filtering the cross-correlated images. The low pass filtering increases the reproducibility of the results obtained from the cross-correlated images both in terms of a single laser spot and between adjacent laser spots.

In a procedure 261, direct coupling artifacts from the plurality of cross-correlated images are removed. Direct coupling artifacts can appear in the cross-correlated images when a seismic source used to propagate a seismic wave through an area of interest is placed substantially equidistant to the area of interest as a detector or multibeam laser. In such a case, direct coupling artifacts may enter the cross-correlated images due to a mixing of the reflections from a matrix of laser spots with vibrations in the multibeam laser, the detector or both. Artifacts due to such a mixing are identifiable in a space-time diagram of the cross-correlated images, where such artifacts appear in the space-time diagram as plane waves characterized by parallel straight lines. According to the disclosed technique, in procedure 261 such direct coupling artifacts are removed by applying a space-time filter to the plurality of cross-correlated images. An example space-time filter could include applying a bi-dimensional Fourier transform to the cross-correlated images, removing a specific frequency in the frequency domain, converting the cross-correlated images back to the time domain and then applying a regularizing filter. In another embodiment, in procedure 261 such direct coupling artifacts are removed by executing a calibration of the vibrations undergone by the multibeam laser, detector or both and then executing a deconvolution of the cross-correlated images.

In a procedure 262, outlier data points in the cross-correlated images are reinterpolated according to the original speckle pattern images stored and the low pass filtered cross-correlated images. In a procedure 264, a seismic map of the area of interest is generated according to the cross-correlated images. The seismic map is then also normalized.

Reference is now made to FIG. 4C which is an illustration of a seismic map generated according to the sub-procedures of FIG. 4B, generally referenced 280, constructed and operative in accordance with a further embodiment of the disclosed technique. Seismic map 280 substantially shows the amplitude, frequency and phase of a seismic wave propagated through an area of interest as a function of distance from a detector and time. An x-axis 282 of seismic map 280 represents a distance in meters from a detector and a y-axis 284 represents time in units of milliseconds. In general, seismic waves that propagate through the ground are characterized by a number of wave components which can be used to map the structure of the ground. One set of known wave components include primary waves (also known as p-waves or pressure waves), secondary waves (also known as s-waves or shear waves) and Rayleigh waves. In general, in homogeneous ground, p-waves propagate fastest, then s-waves and finally Rayleigh waves, which together describe a single seismic wave. If objects are located in the ground, then the p-waves, s-waves and Rayleigh waves may also undergo reflection, diffraction and seismic refraction, which further enable a seismic map of the ground to be generated as well as the location of objects underground to be determined according to the disclosed technique. As shown in seismic map 280, a set of p-waves 286 are detected first, followed by a set of s-waves 288. Changes in the amplitudes of the wave components determined in seismic map 280 as a function of distance enable underground objects to be determined. For example, continuous changes in the amplitudes of the wave components in seismic map 280 are indicated by a set of lines 290. Set of lines 290 show that an underground object approximately 15 meters in length appears to be located approximately between 15 meters and 30 meters from the detector.

Reference is now made to FIG. 4D which is a schematic illustration of a second set of sub-procedures of the method of FIG. 4A, operative in accordance with another embodiment of the disclosed technique. FIG. 4D in particular is a schematic illustration of one embodiment of the sub-procedures of procedure 229 (FIG. 4A). FIG. 4D substantially represents the sub-procedures of the disclosed technique by which an image of an area of interest is generated based on a generated seismic map of the area of interest. FIG. 4D represents the sub-procedures of the disclosed technique for imaging relatively small underground objects in the area of interest. In a procedure 310, data points in the seismic map generated in procedure 229 are temporally narrow band pass filtered. In an alternative to procedure 310, the time series generated in procedure 229 is temporally narrow band pass filtered. In procedure 310, a frequency analysis is executed on the seismic map to determine an image of the area of interest. A narrow frequency band is scanned all over the temporal data for each individual laser spot in the seismic map. Since the seismic wave propagated though the area of interest is substantially short in length, its spectrum is substantially wide. Therefore, some of the frequencies which are present in the seismic wave and are present in the seismic map correspond to seismic resonances of underground objects in the area of interest. As such, the temporal data for some of the scanned frequency bands will be significantly stronger than the temporal data outside those scanned frequency bands. Therefore, in procedure 310, the seismic map is filtered through narrow band filters to generate an image of relatively small underground objects in the area of interest. In general, the frequencies present in the seismic map are inversely proportional to the size of the objects from which they originated from. In a procedure 312, each temporally narrow band pass filtered data point in procedure 310 is normalized. Normalization is executed in procedure 312 since the absolute seismic signal power of each data point may vary significantly. In an alternative to procedure 312, each temporally narrow band pass filtered time series is normalized.

Reference is now made to FIG. 4E is a schematic illustration of a third set of sub-procedures of the method of FIG. 4A, operative in accordance with a further embodiment of the disclosed technique. FIG. 4E in particular is a schematic illustration of the sub-procedures of procedure 312 (FIG. 4D). FIG. 4E substantially represents the sub-procedures of the disclosed technique by which temporally narrow band pass filtered data points are normalized. In a procedure 330, a surface wave component of at least one seismic wave from the seismic map is isolated. The surface wave component can be isolated using spectrograms, wavelet transforms and the like. In a procedure 332, a total energy of the surface wave is determined. In a procedure 334, a ringing energy of the surface wave is determined. The ringing energy of a surface wave substantially represents the main oscillating frequency of the surface wave as observed over a significantly long time period. The main oscillating frequency corresponds to large oscillations near discontinuities in the area of interest. In a procedure 336, the ringing energy determined in procedure 334 is normalized according to the total energy of the surface wave determined in procedure 332. In this respect, variations in the surface wave component of the at least one seismic wave due to differences in ground texture in the area of interest, differences in the reflection of light of the matrix of laser spots from the surface of the area of interest and substantially small (for example, millimeter scale) underground objects in the area of interest, which could affect the absolute seismic power signal, are removed. In general, since the density of the matrix of laser spots is substantially high, adjacent laser spots over a given underground object will resonate at substantially similar frequencies. These substantially similar frequencies enable signal artifacts in the data points of the seismic map to be eliminated using the method of FIG. 4E.

It is noted that the sub-procedures described in FIGS. 4D and 4E may not be effective in imaging and detecting substantially large underground objects. Substantially large underground objects are typically larger than the wavelength of the at least one seismic wave propagated through the area of interest. According to the disclosed technique, a seismic map and image of an area of interest are generated based on reflections and the eventual attenuation of at least one seismic wave, in particular its s-wave, as characterized by reflections from a matrix of laser spots. Depending on the orientation of the detector used to receive reflections from the matrix of laser spots, it could happen that a seismic source is positioned in such a manner that reflections from a large underground object cannot be observed, as reflections are dependent on the orientation of the seismic source in relation to the detector. Since there is no a priori information about the objects in the area of interest, the entire area of interest must be probed and surveyed. As a dense matrix of laser spots is used to image the area of interest, reflections from all directions around an underground object are received. It is therefore substantially simple to determine if reflections from the underground object occurred or not and to thus image the underground object based on the generated seismic map of the area of interest.

Figure 5A:
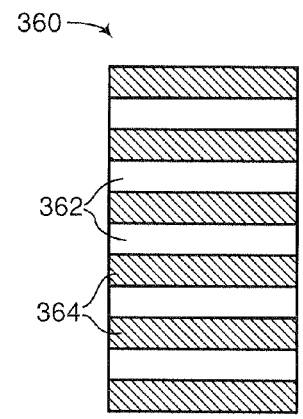
FIG. 5A is a schematic illustration of a Ronchi grating, constructed and operative in accordance with a further embodiment of the disclosed technique.

Reference is now made to FIG. 5A which is a schematic illustration of a Ronchi grating, generally referenced 360, constructed and operative in accordance with a further embodiment of the disclosed technique. According to one embodiment of the disclosed technique, a detector array on the detector or optical sensing system used to detect reflections from a matrix of laser spots is divided into a plurality of sections or sub-arrays, as described above in FIGS. 3A and 3B. According to this embodiment, the detector or optical sensing system used must be a high speed or very high speed detector or sensing system. Such detectors or systems may be expensive, may require fast image processing hardware and may also exhibit a limited performance in detecting the matrix of laser spots. According to another embodiment of the disclosed technique, a single detector of optical sensing system is used in which the detector array is not divided into a plurality of sub-arrays. This embodiment enables simpler and most cost effective elements to be used in detecting the reflections from the matrix of laser spots. This embodiment uses a Ronchi grating, as illustrated in FIG. 5A and explained in further detail below in FIGS. 5B and 5C. Ronchi grating 360 substantially includes a plurality of open sections 362, for enabling light or radiation to pass there through as well as a plurality of opaque sections 364, which prevent light or radiation from passing there through. Plurality of open sections 362 and opaque sections 364 are interspersed on Ronchi grating 360, as shown in FIG. 5A.

Figure 5B:
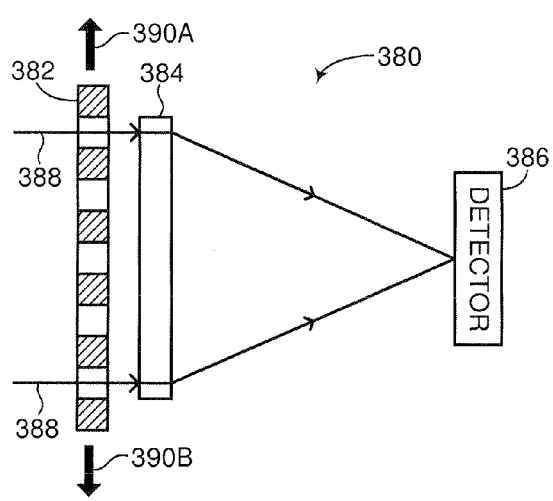
FIG. 5B is another schematic illustration of the optical sensing system of FIG. 1 using the Ronchi grating of FIG. 5A, constructed and operative in accordance with another embodiment of the disclosed technique.

Reference is now made to FIG. 5B which is another schematic illustration of the optical sensing system of FIG. 1 using the Ronchi grating of FIG. 5A, generally referenced 380, constructed and operative in accordance with another embodiment of the disclosed technique. Optical sensing system 380 includes a Ronchi grating 382, a lens 384 and a detector 386. Detector 386 is positioned on the imaging plane (not shown) of lens 384. Ronchi grating 382 substantially moves in a direction which is normal to the direction of incoming reflections to optical sensing system 380. As shown, Ronchi grating 382 moves back and forth cyclically in the directions of an arrow 390A and an arrow 390B at a specified velocity. A motor (not shown) may be coupled with Ronchi grating 382 for moving it back and forth. In terms of its movement, Ronchi grating 382 may have a duty-cycle of approximately 50%. Ronchi grating 382 may be embodied as a liquid crystal screen with addressable rows. Ronchi grating 382 may also be embodied as a physical grid wheel moving at a constant angular velocity.

A reflection 388 is received by optical sensing system 380. Reflection 388 passes through Ronchi grating 382 and lens 384. Lens 384 focuses reflection 388 on detector 386. As Ronchi grating 382 moves as reflection 388 is received by optical sensing system 380, reflection 388 is substantially modulated by Ronchi grating 382, thereby enabling a plurality of reflections (not shown) from a matrix of laser spots (not shown) to be received on a single detector. In this sense, Ronchi grating 382 causes the plurality of reflections as received by detector 386 to be periodic. A central frequency of the received plurality of reflections is thus proportional to the velocity at which Ronchi grating 382 is moved at. The central frequency is substantially equivalent to a carrier frequency of the received plurality of reflections. The modulation depth of Ronchi grating 382 can be maximized by constructing the plurality of open sections (not labeled) and opaque sections (not labeled) to have a spacing on the order of magnitude of the size of the speckles received on detector 386. The plurality of reflections received by detector 386 is provided to a processor (not shown) for further processing. As only a single detector is used instead of a detector array, as described above in FIGS. 3A and 3B, a different method is used to generate a seismic map of the area of interest from the received plurality of reflections on detector 386. This other method is described below in FIGS. 6A and 6B.

Figure 5C:
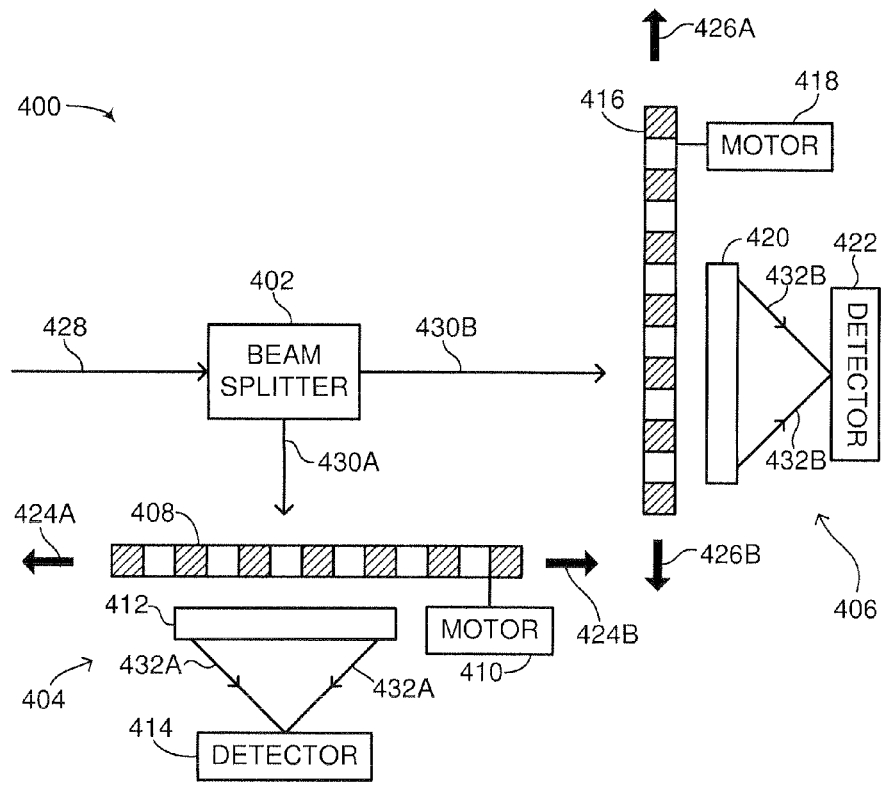
FIG. 5C is a further schematic illustration of the optical sensing system of FIG. 1 using the Ronchi grating of FIG. 5A, constructed and operative in accordance with a further embodiment of the disclosed technique.

Reference is now made to FIG. 5C which is a further schematic illustration of the optical sensing system of FIG. 1 using the Ronchi grating of FIG. 5A, generally referenced 400, constructed and operative in accordance with a further embodiment of the disclosed technique. Optical sensing system 400 includes a beam splitter 402 and two sub-detecting systems 404 and 406, where each sub-detecting system is substantially similar to optical detecting system 380 (FIG. 5A). Sub-detecting system 404 includes a Ronchi grating 408, a motor 410, a lens 412 and a detector 414. Motor 410 is coupled with Ronchi grating 408. Detector 414 is positioned on the imaging plane (not shown) of lens 412. Motor 410 substantially moves Ronchi grating 408 in a direction which is normal to the direction of incoming reflections to sub-detecting system 404 at a specified velocity. As shown, Ronchi grating 408 moves back and forth cyclically in the directions of an arrow 424A and an arrow 424B at a specified velocity. Sub-detecting system 406 includes a Ronchi grating 416, a motor 418, a lens 420 and a detector 422. Motor 418 is coupled with Ronchi grating 416. Detector 422 is positioned on the imaging plane (not shown) of lens 420. Motor 418 substantially moves Ronchi grating 416 in a direction which is normal to the direction of incoming reflections to sub-detecting system 406 at a specified velocity. As shown, Ronchi grating 416 moves back and forth cyclically in the directions of an arrow 426A and an arrow 426B at a specified velocity.

Sub-detecting systems 404 and 406 are positioned such that Ronchi grating 408 and Ronchi grating 416 are perpendicular to one another in optical sensing system 400. An incoming reflection 428 from reflections of a matrix of laser spots (not shown) impinges on beam splitter 402, which substantially equally splits the energy of incoming reflection 428 into two reflected beams, a first reflected beam 430A and a second reflected beam 430B. First reflected beam 430A is substantially focused on detector 414 as shown by a set of arrows 432A. Second reflected beam 430B is substantially focused on detector 422 as shown by a set of arrows 432B. By positioning Ronchi gratings 408 and 416 perpendicularly, the 2D components of a seismic wave propagated in an area of interest can be determined. In this respect, one sub-detecting system receives reflections and processes them as indicative of the propagation of the seismic wave in an x-axis (not shown) defining the area of interest, whereas the other sub-detecting system receives reflections and processes them as indicative of the propagation of the seismic wave in a y-axis (not shown) defining the area of interest.

Figure 8:
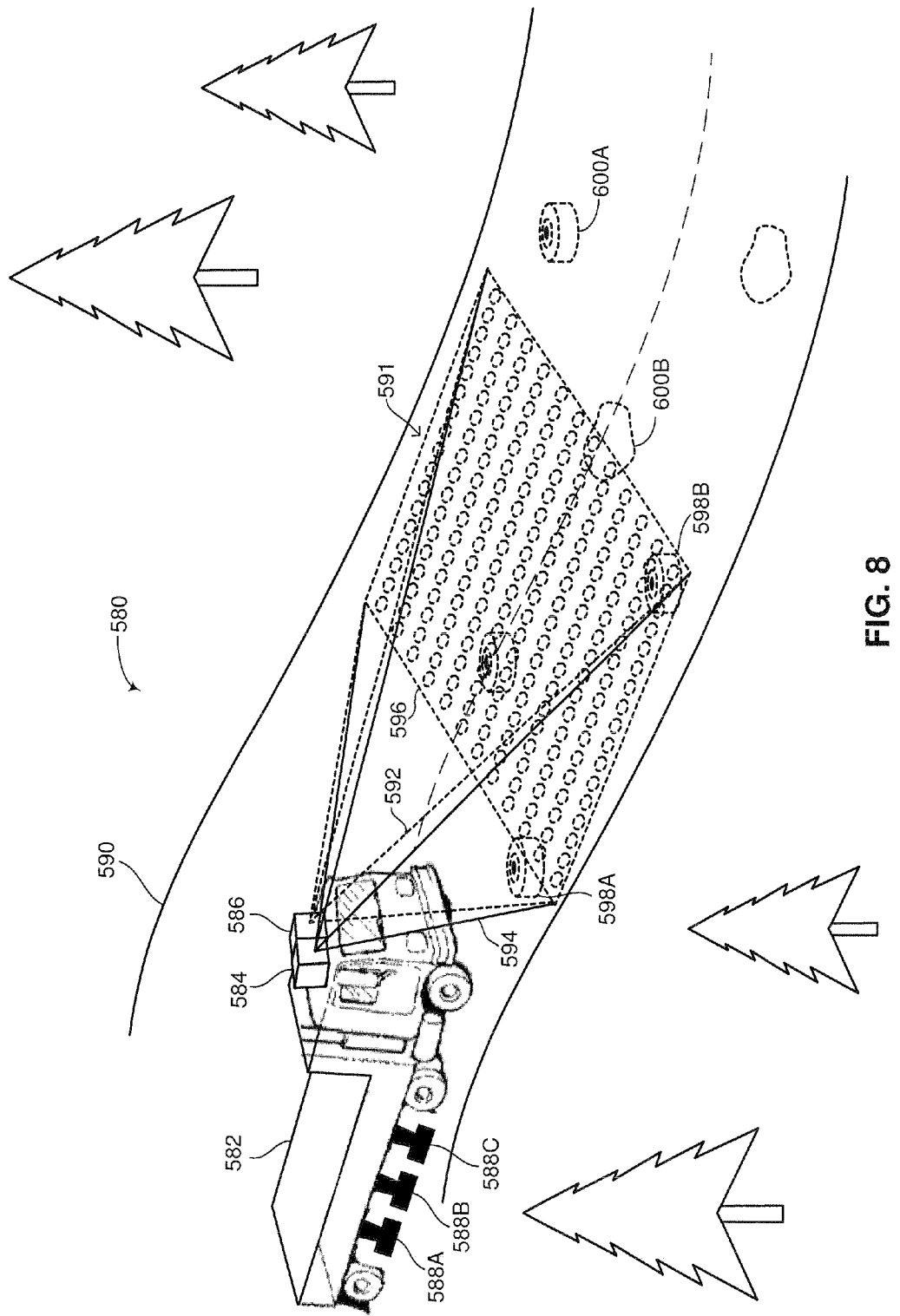
FIG. 8 is a schematic illustration in perspective view of the system of FIG. 1 mounted on a vehicle for detecting and imaging underground objects, constructed and operative in accordance with another embodiment of the disclosed technique.
Figure 9A:
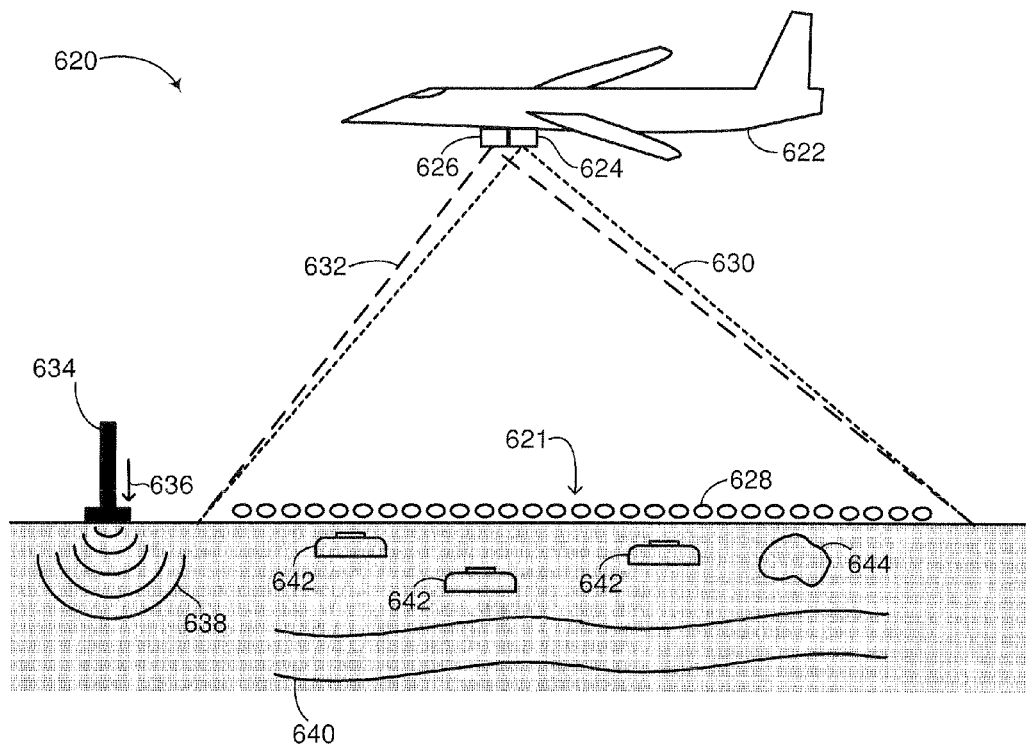
FIG. 9A is a schematic side view illustration of the system of FIG. 1 mounted on an airplane for detecting and imaging underground objects, constructed and operative in accordance with a further embodiment of the disclosed technique.
Figure 9B:
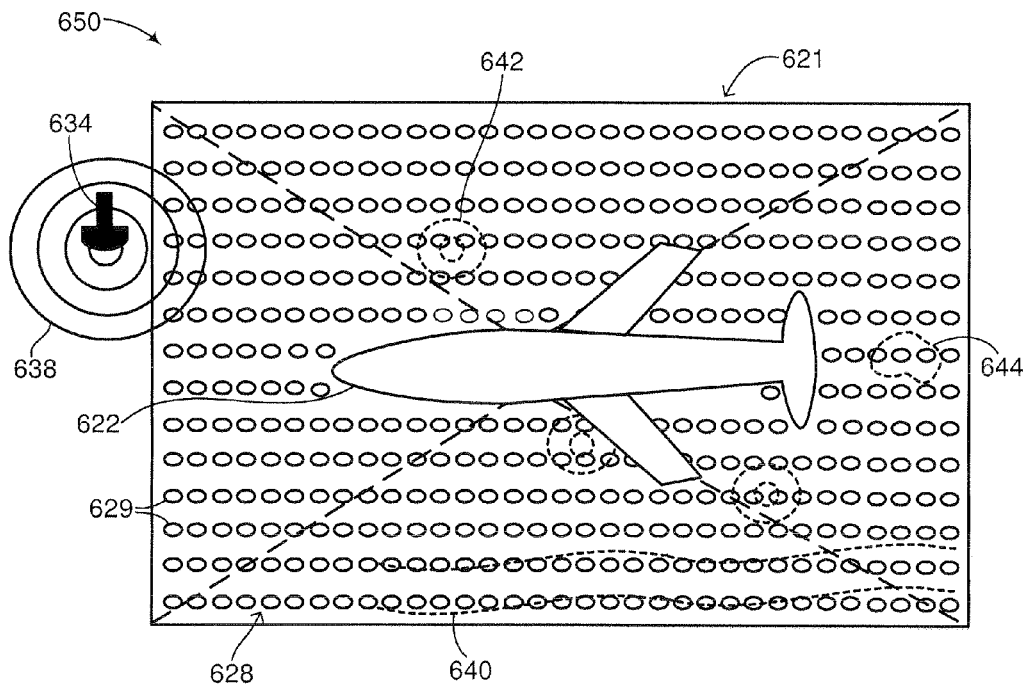
FIG. 9B is a schematic top view illustration of the system of FIG. 1 mounted on an airplane for detecting and imaging underground objects, constructed and operative in accordance with another embodiment of the disclosed technique.

It is noted regarding both optical sensing system 380 (FIG. 5B) and optical sensing system 400 (FIG. 5C), that instead of moving, or scanning the Ronchi gratings of those optical sensing systems, the multibeam laser (not shown) generating the matrix of laser spots used with the above mentioned optical sensing system can be scanned on the ground. In addition, instead of moving, or scanning the Ronchi gratings of the above mentioned optical sensing systems, the detectors, such as detectors 386 (FIG. 5B), 414 and 422, can be moved or scanned. Furthermore, in another embodiment of the disclosed technique, both the multibeam laser and the detector are scanned and moved instead of moving or scanning the Ronchi grating. Each of the above embodiments may be used if the system of the disclosed technique, such as shown below in FIGS. 8, 9A and 9B, is mounted on a moving vehicle or an airplane.

Figure 6A:
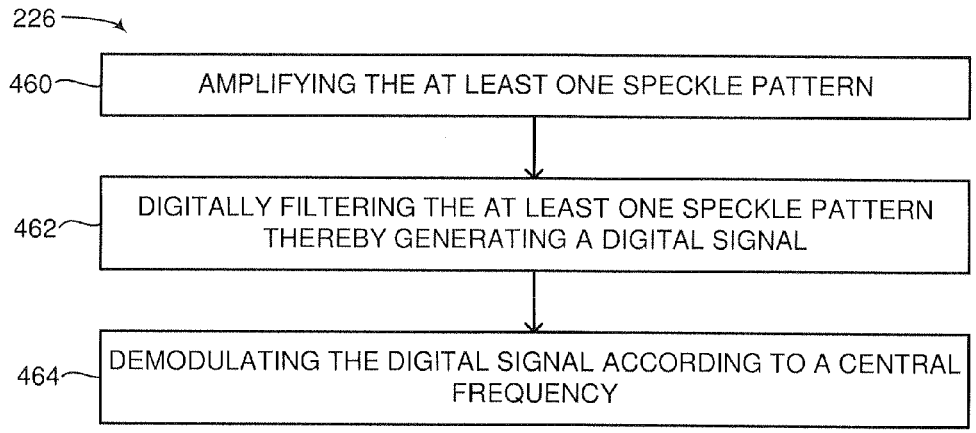
FIG. 6A is a schematic illustration of a fourth set of sub-procedures of the method of FIG. 4A, operative in accordance with another embodiment of the disclosed technique.

Reference is now made to FIG. 6A which is a schematic illustration of a fourth set of sub-procedures of the method of FIG. 4A, operative in accordance with another embodiment of the disclosed technique. FIG. 6A in particular is a schematic illustration of another embodiment of the sub-procedures of procedure 227. FIG. 6A substantially represents the sub-procedures of the disclosed technique by which at least one received speckle pattern is processed to thereby generate a seismic map of an area of interest when a Ronchi grating is used in receiving the at least one speckle pattern. In a procedure 460, the at least one speckle pattern received in procedure 225 (FIG. 4A) is amplified. The speckle pattern may optionally be AC-coupled and then amplified again in a second amplification stage. In a procedure 462 the at least one speckle pattern which was amplified in procedure 460 is digitally filtered thereby generating a digital signal. In a procedure 464, the digital signal is demodulated according to a central frequency, where the central frequency is proportional to the velocity of which a Ronchi grating used with the disclosed technique is moved at, as described above in FIG. 5B. The demodulation in procedure 464 can be executed by multiplying the digital signal with an at rest periodic signal. The at rest periodic signal may be a digital signal received according to the procedures of FIG. 6A when no seismic wave was propagated in an area of interest but reflections where nonetheless received from a matrix of laser spots illuminating the area of interest. The multiplied digital signal is then integrated over one or several periods in relation to the at rest periodic signal. If no seismic wave propagates on the ground of the area of interest, then the multiplied digital signal is perfectly periodic and when demodulated in procedure 464 results in a constant. However if a seismic wave propagates on the ground of the area of interest, the multiplied digital signal will be phase modulated, and when demodulated in procedure 464 will result in a trigonometric function of the phase originating from the propagation of the seismic wave. According to the disclosed technique, the central frequency mentioned in procedure 464 is selected by varying the velocity of the Ronchi grating used with the disclosed technique such that a complete seismic map of the area of interest can be generated. An example of a method for demodulating the digital signal is described below in FIG. 6B and shown schematically and graphically in FIGS. 6C-6F.

Figure 6B:
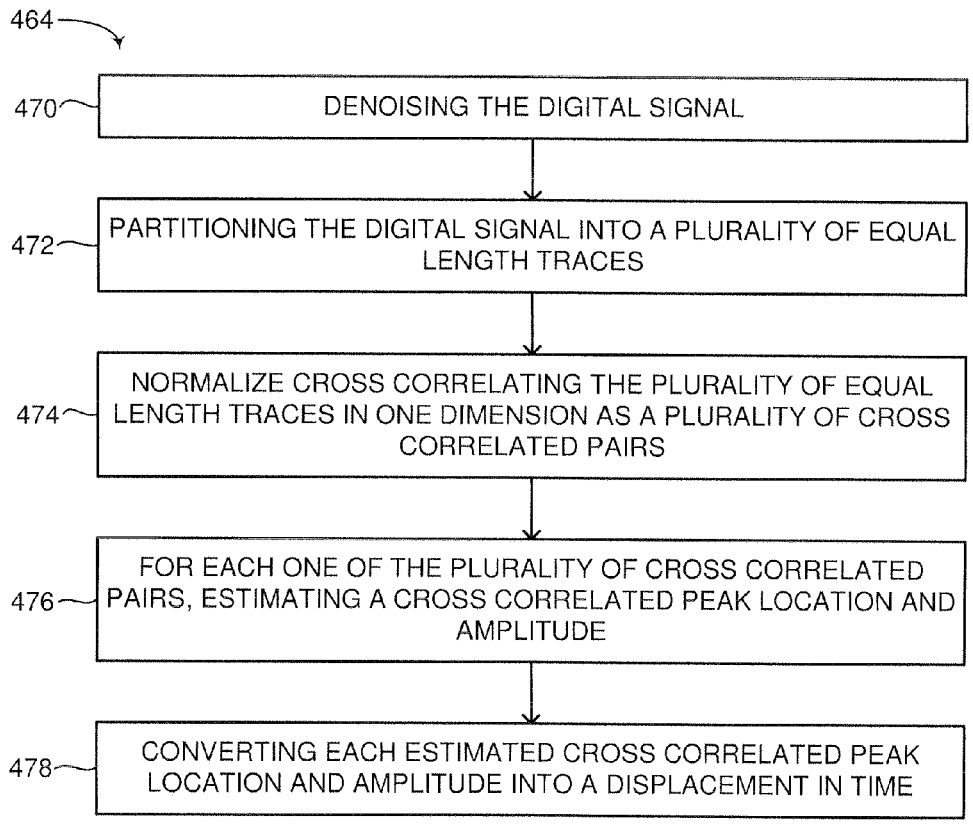
FIG. 6B is a schematic illustration of a fifth set of sub-procedures of the method of FIG. 4A, operative in accordance with a further embodiment of the disclosed technique.

Reference is now made to FIG. 6B which is a schematic illustration of a fifth set of sub-procedures of the method of FIG. 4A, operative in accordance with a further embodiment of the disclosed technique. Reference is also made to FIGS. 6C-6F which are schematically illustrations graphically showing the sub-procedures of FIG. 6B, constructed and operative in accordance with another embodiment of the disclosed technique. FIG. 6B in particular is a schematic illustration the sub-procedures of procedure 464 of FIG. 6A. FIG. 6B substantially represents the sub-procedures a demodulation procedure of the disclosed technique. In a procedure 470, the digital signal of procedure 462 (FIG. 6A) is denoised. The digital signal may be denoised by applying a denoising filter using known digital signal processing software and/or hardware. In a procedure 472, the denoised digital signal is partitioned into a plurality of equal length traces. Each equal length trace has an equal number of samples per trace. Each equal length trace can be referred to as a sampling window. In general, the minimum number of samples per sampling window should be at least equivalent to one modulation cycle as per the carrier frequency of the received plurality of reflections as described above in FIG. 5B.

In a procedure 474, the plurality of equal length traces are normalize cross correlated in one dimension as a plurality of cross correlated pairs. In a procedure 476, for each one of the plurality of cross correlated pairs, a cross correlated peak location and amplitude is estimated. The estimation in procedure 476 can be executed using super-resolution techniques, such as but not limited to, a parabolic fit of the located peaks. It is noted that the estimated peak locations are proportional to the relative tilt of the ground of the area of interest surveyed according to the disclosed technique. In a procedure 478, each estimated cross correlated peak location and amplitude is converted into a displacement in time. The displacement in time substantially represents a velocity of local particles on the ground of the area of interest. Procedure 478 may be optional. In general, procedures 476 and 478 are executed on adjacent cross correlated pairs which results in a recording of the estimated peak location and amplitude of the propagated seismic wave in the area of interest as a function of time. It is noted that after procedure 478, the sub-procedures described above in FIG. 4B may be executed on the estimated peak locations and amplitudes for further processing these estimations and for removing any undesired signals from these estimations, as described above. It is also noted that the signal-to-noise ratio as well as the resolution of the above described peak location and amplitude estimations can be improved by repeating procedures 472-478 except that the sampling windows which are partitioned in procedure 472 are shifted by a fraction of a length of a sampling window instead of being shifted by an integer length of a sampling window. In this respect, sampling windows partitioned in procedure 472 would overlap.

Figure 6C:
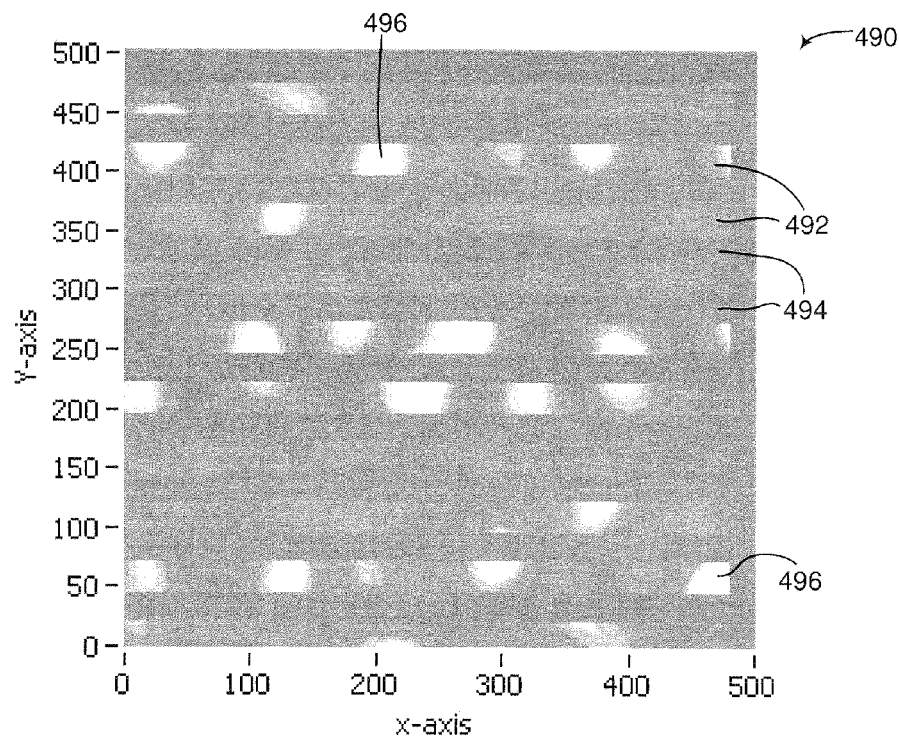
FIGS. 6C-6F are schematically illustrations graphically showing the sub-procedures of FIG. 6B, constructed and operative in accordance with another embodiment of the disclosed technique.
Figure 6D:
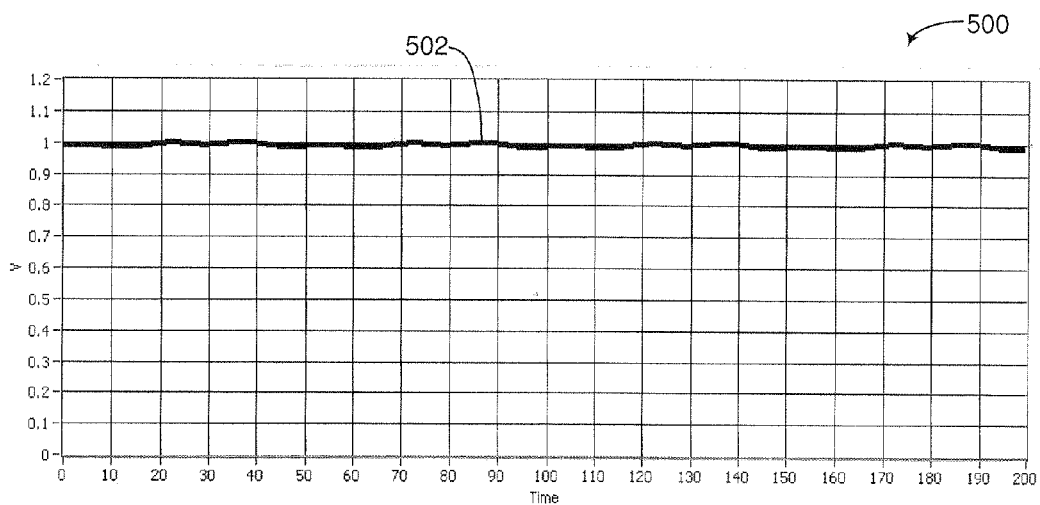

With reference to FIG. 6C, a graph 490 is shown of a speckle pattern which has been digitized, as described above in sub-procedure 462 (FIG. 6A). The speckle pattern detected as an analog signal on a detector (not shown) of the disclosed technique has been digitized in graph 490 at a high dynamic range having at least 10 samples per modulation cycle. Higher sampling rates will increase the sensitivity of the sub-procedures of FIG. 6B. Graph 490 includes a plurality of open sections 492 and a plurality of opaque sections 494, representing a Ronchi grating. A plurality of digitized speckles 496 is visible on graph 490. The x-axis and y-axis of graph 490 represent relative position of plurality of digitized speckles 496. In general, the intensity modulation frequency of the detector is determined by the velocity of the Ronchi grating as well as its density. The density of a Ronchi grating substantially relates to the number of open and opaque sections in the grating as well as their respective sizes. Also, the modulation period is set such that it is less than the period of the fastest propagated seismic wave period by at least a factor of five, i.e., at least 20% of the fastest propagated seismic wave period. With reference to FIG. 6D, a graph 500 shows an analog signal 502 of a detected speckle pattern after amplification, as per sub-procedure 460 (FIG. 6A).

Figure 6E:
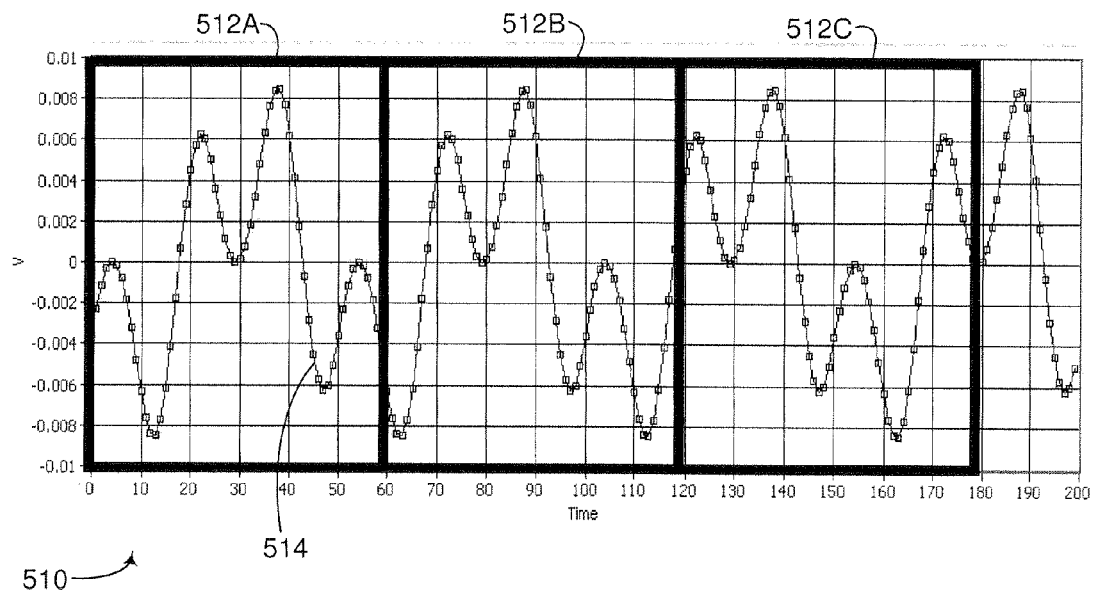
Figure 6F:
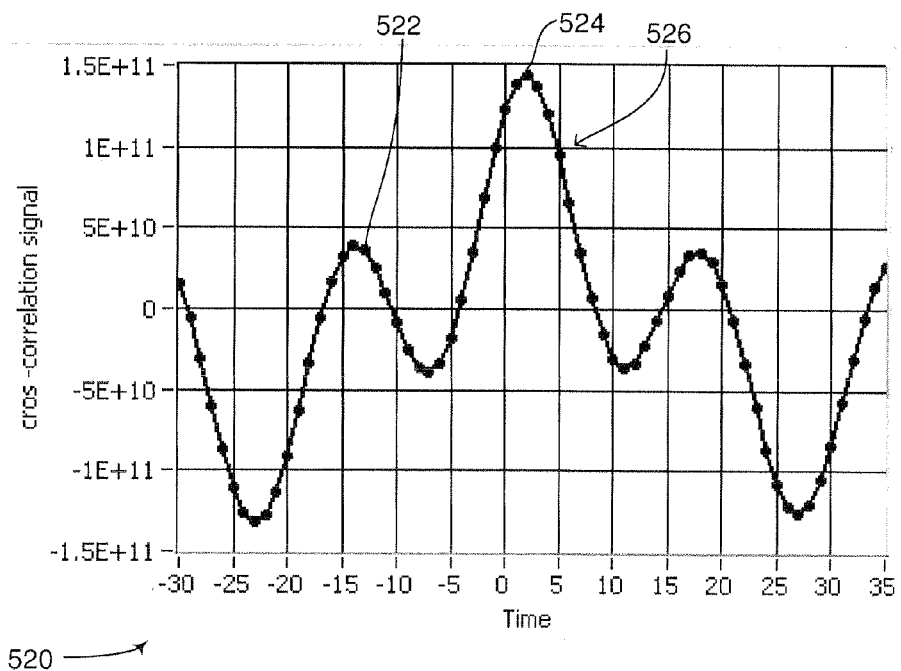

With reference to FIG. 6E, a graph 510 is shown of the amplified signal shown in FIG. 6D after it has been AC-coupled and digitized. A digitized signal 514 has been partitioned into a plurality of equal traces 512A, 512B and 512C. Each one of plurality of equal traces 512A, 512B and 512C has an equal number of samples. FIG. 6E graphically represents sub-procedure 472 (FIG. 6B) described above. As described above, in another embodiment of the disclosed technique, plurality of equal traces 512A, 512B and 512C may overlap one another, With reference to FIG. 6F, a graph 520 is shown of adjacent equal traces normalize cross correlated in one dimension. In particular, a signal 522 represents the normalize cross correlation in one dimension of equal traces 512A and 512B (both of FIG. 6E). FIG. 6F graphically represents sub-procedure 474 (FIG. 6B) described above. Also shown in FIG. 6F are estimated peak locations such as estimated peak location 524, as described above in sub-procedure 476 (FIG. 6B). In addition, the distance of a peak location from the center is relative to the ground displacement at a given time period of the propagated seismic wave, as indicated by an arrow 526.

Figure 7:
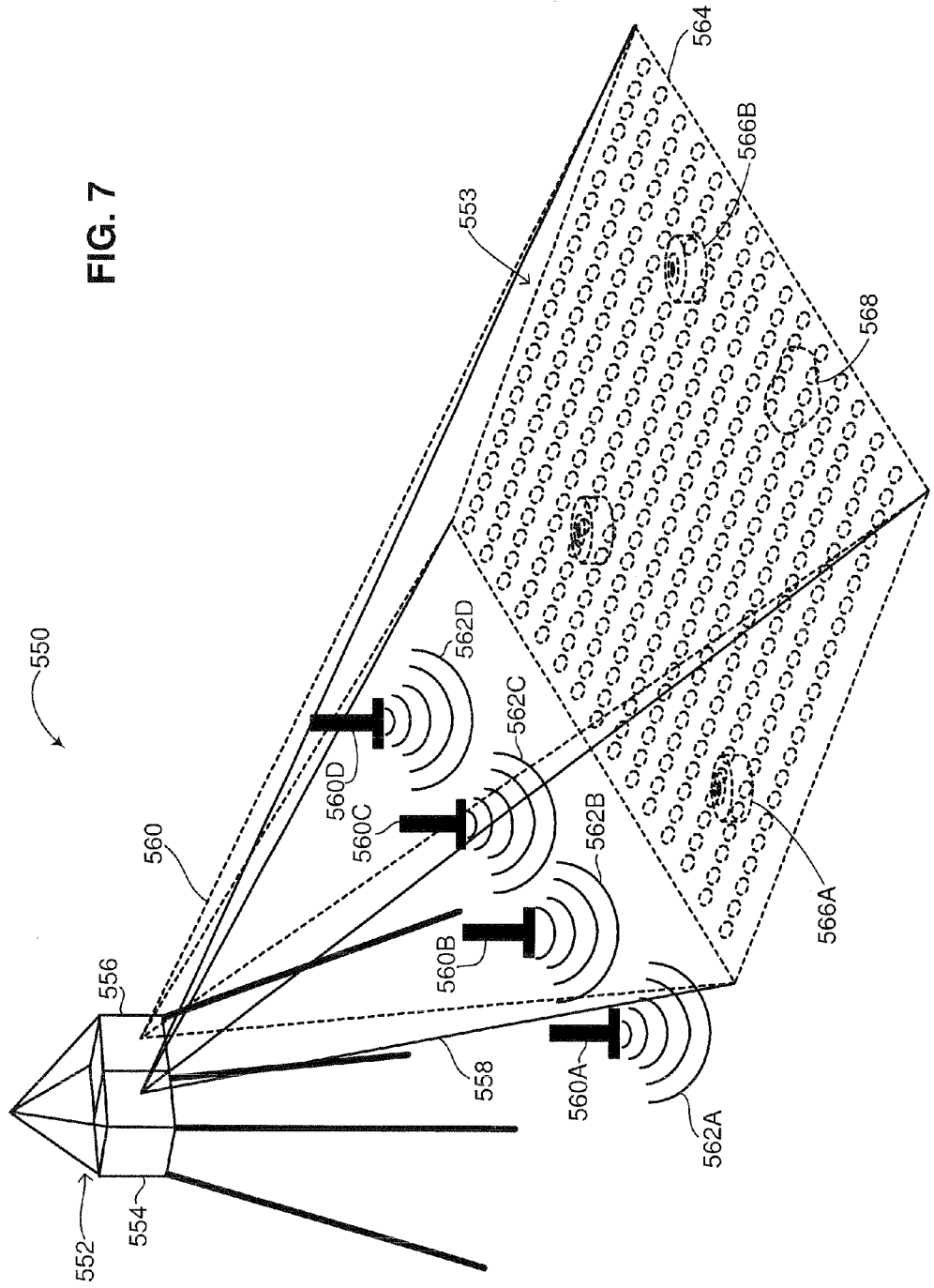
FIG. 7 is a schematic illustration in perspective view of the system of FIG. 1 mounted on a watchtower for detecting and imaging underground objects, constructed and operative in accordance with a further embodiment of the disclosed technique.

Reference is now made to FIG. 7 which is a schematic illustration in perspective view of the system of FIG. 1 mounted on a watchtower for detecting and imaging underground objects, generally referenced 550, constructed and operative in accordance with a further embodiment of the disclosed technique. FIG. 7 includes a watchtower 552. Installed in watchtower 552 is an optical sensing system 554 and a multibeam laser 556. Multibeam laser 556 illuminates an area of interest 553 with a matrix of laser spots 564 as shown by a set of lines 560. Optical sensing system 554 receives reflections from matrix of laser spots 564, as shown by a set of lines 558. A plurality of seismic sources 560A-560D is installed adjacent to watchtower 552. Each one of plurality of seismic sources 560A-560D generates a respective seismic wave, labeled respectively 562A-562D, which respectively propagates through area of interest 553. Optical sensing system 554, multibeam laser 556 and plurality of seismic sources 560A-560D may be coupled with a processor (not shown). The processor receives the reflections of the matrix of laser spots modified by the seismic sources and can detect and determine the presence of underground objects in area of interest 553 such as a plurality of mines 566A and 566B and a buried rock 566. It is noted that area of interest 553 may be hundreds of meters long and may represent enemy territory or forbidden territory. According to the disclosed technique, underground objects can be detected remotely from watchtower 552 by propagating seismic waves into area of interest 553 without having to physically install geophones in the ground adjacent to area of interest 553.

Reference is now made to FIG. 8 which is a schematic illustration in perspective view of the system of FIG. 1 mounted on a vehicle for detecting and imaging underground objects, generally referenced 580, constructed and operative in accordance with another embodiment of the disclosed technique. FIG. 8 represents a mobile underground object or underground threat detection unit. FIG. 8 includes a vehicle 582. Vehicle 582 as illustrated represents a thumper truck including onboard seismic sources 588A-588C installed on vehicle 582. Vehicle 582 could be embodied as another other kind of land vehicle. Installed on vehicle 582 is an optical sensing system 584 and a multibeam laser 586. Multibeam laser 586 illuminates an area of interest 591 with a matrix of laser spots 596 as shown by a set of lines 592. Optical sensing system 584 receives reflections from matrix of laser spots 596, as shown by a set of lines 594. Vehicle 582 travels along a road 590. Unlike in FIG. 7, area of interest 591 constantly changes as vehicle 582 travels down road 590. In one embodiment of the disclosed technique, optical sensing system 584 and multibeam laser 586 can be redirected all over the ground so as to scan a large area that just area of interest 591 as indicated in FIG. 8. Optical sensing system 584, multibeam laser 586 and plurality of seismic sources 588A-588C may be coupled with a processor (not shown). The processor receives the reflections of the matrix of laser spots modified by the seismic sources and can detect and determine the presence of underground objects in area of interest 591 such as a plurality of mines 598A and 598B and a plurality of buried rocks 600A and 600B. The processor may produce warnings if underground objects and/or threats are detected. It is noted that optical sensing system 584, multibeam laser 586 and plurality of seismic sources 588A-588C may be installed on separate vehicles (not shown).

Reference is now made to FIGS. 9A and 9B. FIG. 9A is a schematic side view illustration of the system of FIG. 1 mounted on an airplane for detecting and imaging underground objects, generally referenced 620, constructed and operative in accordance with a further embodiment of the disclosed technique. FIG. 9B is a schematic top view illustration of the system of FIG. 1 mounted on an airplane for detecting and imaging underground objects, generally referenced 650, constructed and operative in accordance with another embodiment of the disclosed technique. Substantially similar elements in FIGS. 9A and 9B are labeled using identical numbering. With reference to FIG. 9A, view 620 shows an airplane 622 mounted with the system of the disclosed technique. Airplane 622 may be an unmanned aerial vehicle (herein abbreviated UAV). Airplane 622 is mounted with an optical sensing system 626 and a multibeam laser 624. Multibeam laser 624 illuminates an area of interest 621 with a matrix of laser spots 628 as shown by a set of lines 630. Multibeam laser 624 can also scan area of interest 621, thereby covering a large surface area. Optical sensing system 626 receives reflections from matrix of laser spots 628, as shown by a set of lines 632. A seismic source 634 on the ground strikes the ground in the direction of an arrow 636, thereby propagating at least one seismic wave 638 in the ground of area of interest 621. Optical sensing system 626, multibeam laser 624 and seismic source 634 may be coupled with a processor (not shown). The processor may synchronize seismic source 634 with multibeam laser 624 and optical sensing system 626. Processor can then detect the presence of underground objects in area of interest 621, such as an underground tunnel 640, a plurality of landmines 642 and a buried rock 644. With reference to FIG. 9B, matrix of laser spots 628 is shown to cover area of interest 621, with matrix of laser spots 628 including a plurality of laser spots 629. As airplane 622 flies over a region, multiple areas of interest (not shown) can be scanned and processed for detecting the presence of underground objects and/or threats.

It will be appreciated by persons skilled in the art that the disclosed technique is not limited to what has been particularly shown and described hereinabove. Rather the scope of the disclosed technique is defined only by the claims, which follow.

The invention claimed is:

1. System for optical seismic surveying of an area of interest, comprising:
   at least one seismic source, for generating at least one seismic wave in said area of interest;
   at least one laser source, for generating a matrix of laser spots on a surface of said area of interest;
   at least one optical sensing system, for detecting reflections of said laser spots, reflected directly from said surface as a speckle pattern; and
   a processor, coupled with said at least one seismic source, said at least one laser source and said at least one optical sensing system,
   wherein said at least one seismic source modifies said speckle pattern;
   wherein said processor determines at least one property of said at least one seismic wave according to the spatial dynamics of said speckle pattern and said modified speckle pattern thereby generating a seismic map of said area of interest; and
   wherein said at least one property comprises the displacement of speckles between said speckle pattern and said modified speckle pattern.

2. The system according to claim 1, wherein said processor generates an image of said area of interest according to said determined at least one property of said at least one seismic wave.

3. The system according to claim 1, wherein said processor generates data representing at least one seismic property of said surveyed area of interest according to said determined at least one property of said at least one seismic wave.

4. The system according to claim 2, wherein said processor detects at least one underground object in said area of interest according to said generated image of said area of interest.

5. The system according to claim 1, wherein said at least one seismic source is a controlled seismic source.

6. The system according to claim 1, wherein said at least one seismic source is a non-controlled seismic source.

7. The system according to claim 1, wherein said at least one seismic source is selected from the list consisting of:
   a mechanical hammer;
   a hydraulic hammer;
   an electric hammer;
   at least one explosive; and
   a seismic background.

8. The system according to claim 1, wherein said at least one laser source is an array of laser diodes.

9. The system according to claim 1, wherein said at least one laser source is an array of fiber lasers.

10. The system according to claim 1, further comprising a diffractive optical element, coupled with said at least one laser source, for generating said matrix of laser spots.

11. The system according to claim 1, wherein said at least one optical sensing system is a 2D array of detectors.

12. The system according to claim 1, wherein said at least one optical sensing system is a high speed camera.

13. The system according to claim 1, said at least one optical sensing system comprising:
   a polarizer, positioned by an opening of said at least one optical sensing system, for reducing sunlight entering said at least one optical sensing system and for increasing a contrast in said speckle pattern;
   a lens, said lens defining an imaging plane, positioned behind said polarizer; and
   a detector array, positioned behind said imaging plane, said detector array defining a detector plane, for receiving said reflections of said laser spots,
   wherein said detector plane is in defocus relative to said imaging plane.

14. The system according to claim 13, wherein said detector plane is divided into a plurality of sub-arrays and wherein each one of said plurality of sub-arrays images a respective one of said reflections of said laser spots.

15. The system according to claim 13, said at least one optical sensing system further comprising:
   a band pass filter, positioned adjacent to said polarizer, for filtering said reflections of said laser spots; and
   an aperture matrix, positioned between said imaging plane and said detector plane, for eliminating crosstalk between adjacent ones of said reflections of said laser spots.

16. The system according to claim 13, said detector array being divided into a plurality of detector sub-arrays, wherein each one of said plurality of detector sub-arrays is positioned to receive a respective one of said reflections of said laser spots.

17. The system according to claim 1, said at least one optical sensing system comprising:
   a polarizer, positioned by an opening of said at least one optical sensing system, for reducing sunlight entering said at least one optical sensing system and for increasing a contrast in said speckle pattern;
   a lens, said lens defining an imaging plane;
   at least one moving Ronchi grating, positioned in front of said lens; and
   a detector, positioned on said imaging plane, for receiving said reflections of said laser spots,
   wherein said moving Ronchi grating moves in a direction parallel to said imaging plane.

18. The system according to claim 17, said at least one optical sensing system further comprising a band pass filter, positioned adjacent to said polarizer, for filtering said reflections of said laser spots.

19. The system according to claim 1, wherein said at least one seismic source, said at least one laser source and said at least one optical sensing system are mounted on a land vehicle and are respectfully coupled with said processor wirelessly.

20. The system according to claim 1, wherein said at least one laser source and said at least one optical sensing system are mounted on a tower, said at least one seismic source is adjacent to said area of interest, and said at least one laser source, said at least one optical sensing system and said at least one seismic source are respectfully coupled with said processor wirelessly.

21. The system according to claim 1, wherein said at least one laser source and said at least one optical sensing system are mounted on an aircraft, said at least one seismic source is adjacent to said area of interest, and said at least one laser source, said at least one optical sensing system and said at least one seismic source are respectfully coupled with said processor wirelessly.

22. Method for optical seismic surveying of an area of interest, comprising the procedures of:
   generating a matrix of laser spots on a surface of said area of interest;
   generating at least one seismic wave in said area of interest, thereby modifying said matrix of laser spots;
   receiving reflections of said modified matrix of laser spots, reflected directly from said surface as at least one speckle pattern; and
   processing the spatial dynamics of said at least one speckle pattern, thereby generating data representing at least one seismic property of said area of interest,
   wherein said at least one seismic property comprises the displacement of speckles between a first one of said at least one speckle pattern and a second one of said at least one speckle pattern.

23. The method according to claim 22, wherein said data representing said at least one seismic property is represented as a seismic map of said area of interest.

24. The method according to claim 22, further comprising the procedures of:
   generating a time sequence of images of said area of interest based on said generated data; and
   detecting at least one underground object in said area of interest according to said generated time sequence of images of said area of interest,
   wherein said generated time sequence of images comprises a time series associated with each one of said received reflections of said modified matrix of laser spots in said generated data representing said at least one seismic property.

25. The method according to claim 22, wherein said procedure of processing comprises the sub-procedures of:
   preprocessing said at least one speckle pattern thereby improving a signal-to-noise ratio in said at least one speckle pattern;
   cross-correlating successive images of said at least one speckle pattern, thereby generating at least one cross-correlated image;
   estimating a cross-correlated peak location and amplitude for each one of said at least one cross-correlated image;
   identifying and removing artifact dephasing in said at least one cross-correlated image;
   low pass filtering said at least one cross-correlated image; and
   removing direct coupling artifacts from said at least one cross-correlated image.

26. The method according to claim 22, further comprising the procedure of equalizing a signal originating from a seismic response of said matrix of laser spots.

27. The method according to claim 22, wherein said procedure of receiving reflections of said modified matrix of laser spots as a speckle pattern comprises the sub-procedure of receiving said reflections via at least one moving Ronchi grating, said at least one moving Ronchi grating moving at a specified velocity, said reflections being received at a central frequency proportional to said specified velocity.

28. The method according to claim 27, wherein said procedure of processing said speckle pattern comprises the sub-procedures of:
digitally filtering said speckle pattern thereby generating a digital signal; and
demodulating said digital signal according to said central frequency.

29. The method according to claim 28, wherein said sub-procedure of demodulating said digital signal comprises the sub-procedures of:
denoising said digital signal;
partitioning said digital signal into a plurality of equal length traces;
normalize cross-correlating said plurality of equal length traces in one dimension as a plurality of cross-correlated pairs;
for each one of said plurality of cross-correlated pairs, estimating a cross-correlated peak location and amplitude; and
converting each said estimated cross-correlated peak location and amplitude into a displacement in time,
wherein each one of said plurality of equal length traces has an equal number of samples per trace.

30. The method according to claim 24, wherein said procedure of generating a time sequence of images comprises the sub-procedures of:
temporally narrow band pass filtering each said time series; and
normalizing each temporally narrow band pass filtered time series.

31. The method according to claim 30, wherein said sub-procedure of normalizing comprises the sub-procedures of:
isolating a surface wave component of said at least one seismic wave;
determining a total energy of said surface wave;
determining a ringing energy of said surface wave; and
normalizing said ringing energy according to said total energy.

* * * * *